(12) United States Patent
De Saeger et al.

(10) Patent No.: US 9,037,586 B2
(45) Date of Patent: May 19, 2015

(54) WORD PAIR ACQUISITION APPARATUS, WORD PAIR ACQUISITION METHOD, AND PROGRAM

(75) Inventors: Stijn De Saeger, Koganei (JP); Kentaro Torisawa, Koganei (JP); Junichi Kazama, Koganei (JP); Kow Kuroda, Koganei (JP); Masaki Murata, Koganei (JP)

(73) Assignee: National Institute of Information and Communications Technology, Tokyo (JP)

( * ) Notice: Subject to any disclaimer, the term of this patent is extended or adjusted under 35 U.S.C. 154(b) by 729 days.

(21) Appl. No.: 13/394,893

(22) PCT Filed: Sep. 7, 2010

(86) PCT No.: PCT/JP2010/065308
§ 371 (c)(1),
(2), (4) Date: Mar. 29, 2012

(87) PCT Pub. No.: WO2011/030752
PCT Pub. Date: Mar. 17, 2011

(65) Prior Publication Data
US 2012/0179682 A1    Jul. 12, 2012

(30) Foreign Application Priority Data

Sep. 9, 2009   (JP) .................................. 2009-207944

(51) Int. Cl.
*G06F 17/30* (2006.01)
*G06F 17/27* (2006.01)

(52) U.S. Cl.
CPC ...... *G06F 17/30707* (2013.01); *G06F 17/2715* (2013.01); *G06F 17/277* (2013.01)

(58) Field of Classification Search
CPC .............. G06F 17/289; G06F 17/3071; G06F 17/30713; G06F 17/30864; G06F 17/30598; G06F 17/30705; G06F 17/30265
See application file for complete search history.

(56) References Cited

U.S. PATENT DOCUMENTS 5,787,422 A * 7/1998 Tukey et al. ........................ 1/1
6,236,987 B1 * 5/2001 Horowitz et al. .................... 1/1

FOREIGN PATENT DOCUMENTS

JP    2003-256447 A    9/2003
JP    2009-265889 A    11/2009

OTHER PUBLICATIONS

Asanoma, N., et al., "Mikaiseki Corpus kara no. Izon Kankei Tango Tsui no Shushu," Proceedings of the 61st (Heisei 12 Nen Koki) National Meeting of Information Processing Society of Japan, Oct. 3, 2000, pp. 2-141-2-142, with English abstract.

(Continued)

*Primary Examiner* — Cam-Y Truong
(74) *Attorney, Agent, or Firm* — Tomoko Nakajima; Cermak Nakajima & McGowan LLP

(57) ABSTRACT

Conventionally, it has been impossible to appropriately acquire word pairs having a prescribed relationship. Such word pairs can be appropriately acquired with a word pair acquisition apparatus including: a word class information storage unit in which word class information can be stored; a class pair favorableness degree storage unit in which a class pair favorableness can be stored; a seed pattern storage unit in which can be stored one or more seed patterns; a word pair acquisition unit that acquires one or more word pairs co-occurring with the seed pattern from sentence groups; a class pair favorableness degree acquisition unit that acquires a class pair favorableness degree; a score determination unit that uses the class pair favorableness degree to determine a score of each of the word pairs; and a word pair selection unit that acquires one or more word pairs having a high score.

11 Claims, 17 Drawing Sheets

(56) References Cited

OTHER PUBLICATIONS

Pantel, P., et al., "Espresso: Leveraging Generic Patterns for Automatically Harvesting Semantic Relations," Proceedings of the 21st International Conference on Computational Linguistics and 44th Annual Meeting of the ACL, Jul. 2006, Sydney, Australia, pp. 113-120.

International Search Report for PCT Patent App. No. PCT/JP2010/065308 (Nov. 22, 2010).

* cited by examiner

FIG.7

| $C_{290}$ | $C_{471}$ |
|---|---|
| periodontal disease | nitrogen oxide |
| allergy | sulfur oxide |
| acne | prion |
| inflammation | $NO_x$ |
| ⋮ | ⋮ |

FIG.8

| class | average frequency of occurrence |
|---|---|
| 9 | 3581266.93 |
| 49 | 26505.42 |
| 385 | 1865229.69 |
| 494 | 4707922.42 |
| 118 | 21214.89 |
| 205 | 7521190.63 |
| ⋮ | ⋮ |

FIG.9

| class pair | rank | word pair |
|---|---|---|
| $C_{471} \times C_{290}$ | 22 | tyrosinase-freckle |
| $C_{468} \times C_{290}$ | 62 | mold-odor |
| $C_{468} \times C_{290}$ | 274 | mite-skin troubles |
| $C_{471} \times C_{290}$ | 394 | residual chlorine-itch |
| $C_{475} \times C_{1}$ | 5889 | Japanese rice wine-obesity |
| $C_{290} \times C_{290}$ | 6523 | decayed tooth-mouth odor |
| $C_{471} \times C_{1}$ | 17135 | taurine-arteriosclerosis |

FIG.11

| class pair | rank | word pair |
|---|---|---|
| $C_{176} \times C_{475}$ | 614 | malt-whiskey |
| $C_{176} \times C_{227}$ | 1128 | collagen-jelly |
| $C_{176} \times C_{227}$ | 5032 | cacao bean-chocolate |
| $C_{252} \times C_{270}$ | 34971 | sugarcane-automotive fuel |

FIG.13

| class pair | rank | word pair |
|---|---|---|
| $C_{172} \times C_{49}$ | 820 | thermostat-heating |
| $C_{333} \times C_{49}$ | 831 | expanded polystyrene-evaporation |
| $C_{212} \times C_{191}$ | 11856 | means-flood damage |
| $C_{240} \times C_{191}$ | 17627 | conference-accident |

FIG.15

| term | probability distribution information |
|---|---|
| automobile | (0. 1, 0. 05, 0, 0. 2, · · · · ·) |
| small vehicle | (0. 08, 0. 03, 0. 02, 0. 3, · · · · ·) |
| hybrid vehicle | (0. 07, 0. 04, 0. 1, 0. 15, · · · · ·) |
| ⋮ | ⋮ |

WORD PAIR ACQUISITION APPARATUS, WORD PAIR ACQUISITION METHOD, AND PROGRAM

TECHNICAL FIELD

This application is a national phase entry under 35 U.S.C. §371 of PCT Patent Application No. PCT/JP2010/065308, filed on Sep. 7, 2010, which claims priority under 35 U.S.C. §119 to Japanese Patent Application No. 2009-207944, filed Sep. 9, 2009, both of which are incorporated by reference.

BACKGROUND ART

Conventionally, there have been word pair acquisition apparatuses in which a small amount of word pairs that are desired to be extracted is provided and patterns are acquired from the word pairs. Also, the conventional word pair acquisition apparatuses acquire word pairs co-occurring with the acquired patterns (see, for example, Non-Patent Document 1).

[Non-Patent Document 1] P. Pantel and M. Pennacchiotti. Espresso: Leveraging generic patterns for automatically harvesting semantic relations. In Proceedings of the 21st International Conference on Computational Linguistics and 44th Annual Meeting of the Association for Computational Linguistics (COLINGACL-06), pages 113-120, 2006.

DISCLOSURE OF INVENTION

Problem to be Solved by the Invention

However, the conventional word pair acquisition apparatuses have not been able to appropriately acquire word pairs having a prescribed relationship.

Means for Solving the Problems

A first aspect of the present invention is directed to a word pair acquisition apparatus including: a sentence group storage unit in which one or more sentence groups can be stored; a word class information storage unit in which can be stored two or more pieces of word class information each including, in association with each other, one or more words and a class identifier for identifying a class to which the one or more words belong; a class pair favorableness degree storage unit in which can be stored a class pair favorableness degree serving as an index indicating the appropriateness of two classes; a word pair storage unit in which one or more word pairs each consisting of two words can be stored; a class pair favorableness degree acquisition unit that acquires, from the class pair favorableness degree storage unit, a class pair favorableness degree of two classes to which the words included in the one or more word pairs stored in the word pair storage unit respectively belong; a score determination unit that uses the class pair favorableness degree acquired by the class pair favorableness degree acquisition unit to determine a score of each of the word pairs in the word pair storage unit; a word pair selection unit that acquires one or more word pairs having a score that has been determined by the score determination unit that is high enough to satisfy a predetermined condition; and a word pair output unit that outputs the one or more word pairs acquired by the word pair selection unit.

This configuration makes it possible to appropriately acquire word pairs having a prescribed relationship using a class pair favorableness degree.

A second aspect of the present invention is directed to the word pair acquisition apparatus according to the first aspect, further including: a seed pattern storage unit in which can be stored one or more seed patterns each serving as a pattern used for acquiring two word pairs having a prescribed relationship; and a class pair favorableness degree calculation unit that calculates a class pair favorableness degree such that the class pair favorableness degree increases with an increase in the number of times that or the rate at which word pairs respectively belonging to two classes co-occur with the one or more seed patterns in the one or more sentence groups in the sentence group storage unit, wherein the class pair favorableness degree of the two classes calculated by the class pair favorableness degree calculation unit is the class pair favorableness degree stored in the class pair favorableness degree storage unit.

This configuration makes it possible to appropriately calculate a class pair favorableness degree, and appropriately acquire word pairs having a prescribed relationship using the class pair favorableness degree.

A third aspect of the present invention is directed to the word pair acquisition apparatus according to the first or second aspect, further including: a pattern storage unit in which can be stored one or more patterns that are not a seed pattern and are used for acquiring two word pairs having the prescribed relationship; a pattern similarity storage unit in which can be stored a similarity between each of the one or more patterns stored in the pattern storage unit and the seed pattern on a pattern-by-pattern basis; and a word pair acquisition unit that acquires either the one or more seed patterns stored in the seed pattern storage unit or the one or more patterns stored in the pattern storage unit, and acquires, from the one or more sentence groups stored in the sentence group storage unit, one or more word pairs co-occurring with the seed patterns or the patterns, wherein the score determination unit also uses the similarity between each of the one or more patterns and the seed patterns that is stored in the pattern similarity storage unit to determine a score of each of the word pairs acquired by the word pair acquisition unit.

This configuration makes it possible to more appropriately acquire word pairs having a prescribed relationship using the similarity between the seed patterns and the patterns.

A fourth aspect of the present invention is directed to the word pair acquisition apparatus according to the third aspect, further including a pattern similarity calculation unit that calculates a similarity such that the similarity increases with an increase in overlap between a class pair corresponding to a word pair co-occurring with the one or more seed patterns and a class pair corresponding to a word pair co-occurring with each of the one or more patterns stored in the pattern storage unit, wherein the similarity calculated by the pattern similarity calculation unit is the similarity stored in the pattern similarity storage unit.

This configuration makes it possible to appropriately calculate a similarity between the seed patterns and the patterns, and more appropriately acquire word pairs having a prescribed relationship using the similarity.

A fifth aspect of the present invention is directed to the word pair acquisition apparatus according any one of the first to fourth aspects, further including an affinity information storage unit in which can be stored affinity information serving as information relating to the affinity between each of the one or more word pairs and each of the one or more patterns, wherein the score determination unit also uses the affinity information in the affinity information storage unit to determine a score of each of the word pairs acquired by the word pair acquisition unit.

This configuration makes it possible to more appropriately acquire word pairs having a prescribed relationship using the affinity between patterns and word pairs.

A sixth aspect of the present invention is directed to the word pair acquisition apparatus according to the fifth aspect, further including an affinity information calculation unit that calculates affinity information such that the affinity information increases with an increase in the number of times that or the rate at which the one or more word pairs acquired by the word pair acquisition unit co-occur with each of the one or more patterns, wherein the affinity information in the affinity information storage unit is the affinity information calculated by the affinity information calculation unit.

This configuration makes it possible to appropriately calculate the affinity between patterns and word pairs, and more appropriately acquire word pairs having a prescribed relationship using that affinity.

A seventh aspect of the present invention is directed to the word pair acquisition apparatus according to the sixth aspect, wherein the score determination unit determines, as a score of each of the word pairs, a score of the seed pattern or the pattern that exhibits a maximum value of the product of the class pair favorableness degree, the similarity between the seed pattern and the pattern, and the affinity information.

This configuration makes it possible to calculate the scores of word pairs with high precision, and as a result, it is possible to very appropriately acquire word pairs having a prescribed relationship.

An eighth aspect of the present invention is directed to the word pair acquisition apparatus according to the third to seventh aspect, further including a pattern acquisition unit that performs morphological analysis and dependency analysis on each sentence of one or more sentence groups stored in the sentence group storage unit, and acquires, taking a first noun or noun phrase as a starting point and a second noun or noun phrase as an end point, a linkage of morphemes from the starting point to the end point as a pattern, or acquires, as a pattern, a linkage of morphemes from the starting point to a morpheme where a linkage of morphemes starting from the starting point and a linkage of morphemes starting from the end point are linked, wherein the pattern in the pattern storage unit is the pattern acquired by the pattern acquisition unit.

This configuration makes it possible to appropriately acquire patterns from sentence groups, and appropriately acquire word pairs having a prescribed relationship using the patterns.

A ninth aspect of the present invention is directed to the word pair acquisition apparatus according to any one of the first to eighth aspects, further including: an excluded class pair storage unit in which can be stored one or more excluded class pairs each consisting of two class identifiers for identifying a class pair corresponding to a word pair that is not to be eventually output; and a word pair exclusion unit that excludes the word pair corresponding to the one or more excluded class pairs from word pairs that are to be output.

This configuration can reduce the possibility of outputting inappropriate word pairs, and as a result, it is possible to more appropriately acquire word pairs having a prescribed relationship.

A tenth aspect of the present invention is directed to the word pair acquisition apparatus according to the ninth aspect, further including: a class occurrence frequency information storage unit in which can be stored class occurrence frequency information including a pair of a class identifier and an average frequency of occurrence, in the one or more sentence groups, of a word belonging to each class, on a class-by-class basis; and an excluded class pair accumulation unit that accumulates, in the excluded class pair storage unit, class identifiers for two classes having a difference equal to or greater than a predetermined threshold in the average frequency of occurrence as an excluded class pair.

This configuration can reduce the possibility of outputting inappropriate word pairs to a great extent, and as a result, it is possible to more appropriately acquire word pairs having a prescribed relationship.

An eleventh aspect of the present invention is directed to the word pair acquisition apparatus according to any one of the first to tenth aspects, further including a word class information acquisition unit that uses the one or more sentence groups in the sentence group storage unit to acquire one or more pieces of word class information such that words co-occurring with the same verb or with the same verb and a postpositional particle a large number of times or at a high rate belong to the same class, wherein the word class information in the word class information storage unit is the word class information acquired by the word class information acquisition unit.

This configuration makes it possible to more appropriately acquire word class information.

Effect of the Invention

With the word pair acquisition apparatus according to the present invention, it is possible to appropriately acquire word pairs having a prescribed relationship.

BEST MODE FOR CARRYING OUT THE INVENTION

Hereinafter, an embodiment of a word pair acquisition apparatus and the like will be described with reference to the accompanying drawings. Note that components denoted by the same reference numerals in the embodiment perform similar operations, and thus a description thereof may not be repeated.

Embodiment 1

In this embodiment, a description will be given of a word pair acquisition apparatus that acquires two word pairs having a prescribed relationship. The word pair acquisition apparatus according to this embodiment selects word pairs using, as an index, the appropriateness of class pairs to which word pairs belong (a class pair favorableness degree, described below). Also, the word pair acquisition apparatus selects word pairs using, as an index, the appropriateness (a similarity, described below) of patterns that are used for extracting word pairs. Furthermore, the word pair acquisition apparatus selects word pairs using the affinity (affinity information, described below) between patterns and word pairs.

FIG. 1 is a conceptual diagram of a word acquisition system including a word pair acquisition apparatus 1 according to this embodiment. The word acquisition system includes the word pair acquisition apparatus 1 and one or more sentence group storage apparatuses 2. The sentence group storage apparatus 2 is a server device in which a sentence group is stored. The sentence group storage apparatuses 2 are, for example, server devices on the web, and one or more web pages are stored therein. In this case, the sentence group is web pages. The word pair acquisition apparatus 1 acquires sentence groups from the one or more sentence group storage apparatuses 2, and the sentence group is at least temporarily stored in the word pair acquisition apparatus 1.

FIGS. 2 and 3 are block diagrams showing the word pair acquisition apparatus 1 according to this embodiment. FIG. 2 is a block diagram focusing mainly on those components of the word pair acquisition apparatus 1 that perform the processing for acquiring word pairs. FIG. 3 is a block diagram focusing mainly on those components of the word pair acquisition apparatus 1 that perform environment preparation before performing the processing for acquiring word pairs. Note, however, that FIGS. 2 and 3 merely show an example of the configuration in which the word pair acquisition apparatus 1 is divided.

The word pair acquisition apparatus 1 includes a sentence group storage unit 101, a word pair storage unit 102, a word class information storage unit 103, a seed pattern storage unit 104, a pattern storage unit 105, a class pair favorableness degree storage unit 106, a pattern similarity storage unit 107, an affinity information storage unit 108, an excluded class pair storage unit 109, a class occurrence frequency information storage unit 110, a word pair acquisition unit 111, a word pair accumulation unit 112, a word class information acquisition unit 113, a word class information accumulation unit 114, a pattern acquisition unit 115, a pattern accumulation unit 116, a class pair favorableness degree calculation unit 117, a class pair favorableness degree accumulation unit 118, a pattern similarity calculation unit 119, a pattern similarity accumulation unit 120, an affinity information calculation unit 121, an affinity information accumulation unit 122, a class pair favorableness degree acquisition unit 123, a pattern similarity acquisition unit 124, an affinity information acquisition unit 125, a score determination unit 126, a word pair selection unit 127, a word pair output unit 128, a word pair exclusion unit 129, an excluded class pair accumulation unit 130, and a class occurrence frequency information calculation unit 131.

One or more sentence groups can be stored in the sentence group storage unit 101. The sentence group is, for example, a web page. However, the sentence group can be anything. The sentence group may be text data, a prescribed database, and the like, and there is no limitation with respect to the structure as well. The sentence group in the sentence group storage unit 101 is preferably a sentence group acquired by communication means, broadcast receiving means, or the like. The sentence group storage unit 101 is preferably a nonvolatile recording medium, but can be realized by a volatile recording medium. There is no limitation with respect to the process by which the sentence group is stored in the sentence group storage unit 101. For example, the sentence group may be stored in the sentence group storage unit 101 via a recording medium, or the sentence group sent via a communication line or the like may be stored in the sentence group storage unit 101. Alternatively, the sentence group input via an input device may be stored in the sentence group storage unit 101.

One or more word pairs can be stored in the word pair storage unit 102. A "word pair" consists of two words having a prescribed relationship. The "word" as used herein is usually a noun, a noun phrase, or the like. However, other parts of speech such as an adjective may be considered as the word. Further, a "prescribed relationship" is, for example, the relationship between cause and effect, the relationship between a raw material and a product, the relationship between a phenomenon and preventing means for that phenomenon, or the like. When the prescribed relationship is the relationship between cause and effect, the word pair consists of, for example, "virus" and "cold". The word pair storage unit 102 is preferably a nonvolatile recording medium, but can be realized by a volatile recording medium. There is no limitation with respect to the process by which the word pair is stored in the word pair storage unit 102. However, usually, the word pair accumulation unit 112 accumulates the word pair acquired by the word pair acquisition unit 111 in the word pair storage unit 102.

Two or more pieces of word class information can be stored in the word class information storage unit 103. The word class information is information including, in association with each other, one or more words and a class identifier for identifying the class to which the one or more words belong. Regarding "class", words (usually, nouns) often co-occurring with the same verb are defined as words belonging to the same class. Also, words (usually, nouns) often co-occurring with the same verb and a postpositional particle may be defined as words belonging to the same class. "Often co-occurring" as used herein means co-occurring with the same verb, or the same verb and a postpositional particle a number of times equal to or a greater than a predetermined number of times (frequency) or at a rate equal to or higher than a predetermined rate. The word class information may be information including a class identifier and one or more word identifiers for identifying one or more words. The word class information storage unit 103 is preferably a nonvolatile recording medium, but can be realized by a volatile recording medium. There is no limitation with respect to the process by which the word class information is stored in the word class information storage unit 103. However, usually, the word class information accumulation unit 114 accumulates the word class information acquired by the word class information acquisition unit 113 in the word class information storage unit 103.

One or more seed patterns can be stored in the seed pattern storage unit 104. A "seed pattern" refers to a pattern used for acquiring two word pairs having a prescribed relationship. The seed pattern is a previously provided pattern. The seed pattern is a pattern serving as a source for acquiring word pairs and a new pattern. A "pattern" is a character string containing two words and an expression pattern. The pattern may be, for example, "X causes Y", "Y caused by X", and the like. Two words replacing X and Y here constitute a word pair. In other words, X and Y are so-called variables. Character string may be assigned to variables. Note that the number of the seed patterns stored in the seed pattern storage unit 104 may be 10 or 20, for example. The seed pattern storage unit 104 is preferably a nonvolatile recording medium, but can be realized by a volatile recording medium.

There is no limitation with respect to the process by which the seed pattern is stored in the seed pattern storage unit 104. However, the seed pattern is usually accumulated in the seed pattern storage unit 104 by manual entry by the user.

One or more patterns can be stored in the pattern storage unit 105. A "pattern" is a pattern that is not a seed pattern, and is used for acquiring two word pairs having a prescribed relationship. However, the pattern may contain the seed pattern. The pattern storage unit 105 is preferably a nonvolatile recording medium, but can be realized by a volatile recording medium. There is no limitation with respect to the process by which the pattern is stored in the pattern storage unit 105. However, usually, the pattern accumulation unit 116 accumulates the pattern acquired by the pattern acquisition unit 115 in the pattern storage unit 105. Note that the pattern may also be accumulated by manual operation by the user.

A class pair favorableness degree serving as an index indicating the appropriateness of two classes may be stored in the class pair favorableness degree storage unit 106. Here, the two classes are referred to as a "class pair". An "index indicating the appropriateness of two classes" refers to the extent that word pairs belonging to two classes often co-occur with a seed pattern. The higher the extent that word pairs belonging to two classes often co-occur with a seed pattern, the better the class pair. The class pair favorableness degree is a numerical value. The better a class pair, the higher the value of the class pair favorableness degree thereof. Usually, one or more pieces of class pair favorableness degree information each including a pair of a class pair favorableness degree and class identifiers for two classes are stored in the class pair favorableness degree storage unit 106. Further, the use of an index indicating the inappropriateness of a class pair is considered to be equivalent to the use of the class pair favorableness degree. When the class pair favorableness degree is an index indicating the inappropriateness of a class pair, the higher the class pair favorableness degree of a class pair, the worse the class pair, for example. Note that when the class pair favorableness degree is an index indicating the inappropriateness of a class pair, calculation is performed taking a class pair favorableness degree as a reciprocal in an expression described below, for example. The class pair favorableness degree storage unit 106 is preferably a nonvolatile recording medium, but can be realized by a volatile recording medium. There is no limitation with respect to the process by which the class pair favorableness degree is stored in the class pair favorableness degree storage unit 106. However, usually, the class pair favorableness degree accumulation unit 118 accumulates the class pair favorableness degree calculated by the class pair favorableness degree calculation unit 117 in the class pair favorableness degree storage unit 106.

The similarity between each of the one or more patterns stored in the pattern storage unit 105 and the seed pattern may be stored in the pattern similarity storage unit 107 on a pattern-by-pattern basis. The pattern similarity storage unit 107 includes, for example, a pattern identifier for identifying a pattern and a similarity in association with each other. Alternatively, the pattern similarity storage unit 107 may include, for example, a pattern and a similarity in association with each other. There is no particular limitation with respect to the method for calculating the similarity between the pattern and the seed pattern. A specific method for calculating the similarity will be described later. The pattern similarity storage unit 107 is preferably a nonvolatile recording medium, but can be realized by a volatile recording medium. There is no limitation with respect to the process by which the similarities are stored in the pattern similarity storage unit 107. However, usually, the pattern similarity accumulation unit 120 accumulates the similarity calculated by the pattern similarity calculation unit 119 in the pattern similarity storage unit 107.

Affinity information relating to the affinity between each of the one or more word pairs and each of the one or more patterns may be stored in the affinity information storage unit 108. The affinity information is usually a numerical value indicating the degree of affinity between the word pair and the pattern. The greater the affinity information, the higher the degree of affinity between a word pair and a pattern. For example, the affinity information storage unit 108 includes, in association with each other, a pattern identifier or pattern, a word pair or identifier for a word pair (may also be two word identifiers), and affinity information. Alternatively, the affinity information may be the degree of lowness of the affinity between a word pair and a pattern. In such a case, the smaller the value of the affinity information, the higher the affinity between the word pair and the pattern. The affinity information storage unit 108 is preferably a nonvolatile recording medium, but can be realized by a volatile recording medium. There is no limitation with respect to the process by which the affinity information is stored in the affinity information storage unit 108. However, usually, the affinity information accumulation unit 122 accumulates the affinity information calculated by the affinity information calculation unit 121 in the affinity information storage unit 108.

One or more excluded class pairs can be stored in the excluded class pair storage unit 109. An "excluded class pair" is information indicating a class pair corresponding to word pairs that are not to be eventually output. Usually, the excluded class pair is information including two class identifiers. However, the excluded class pair may be information, such as word pairs, serving as a source for acquiring two class identifiers. The excluded class pair storage unit 109 is preferably a nonvolatile recording medium, but can be realized by a volatile recording medium. There is no limitation with respect to the process by which the excluded class pair is stored in the excluded class pair storage unit 109. However, usually, the excluded class pair acquired by the excluded class pair accumulation unit 130 is accumulated in the excluded class pair storage unit 109. However, the user may accumulate the excluded class pair in the excluded class pair storage unit 109 by manual entry.

The class occurrence frequency information can be stored in the class occurrence frequency information storage unit 110 on a class-by-class basis. The "class occurrence frequency information" refers to information including a pair of a class identifier and the average frequency of occurrence, in one or more sentence groups, of a word belonging to each class. The average frequency of occurrence has been acquired by a class occurrence frequency information acquisition unit (not shown), for example, by the following processing. The class occurrence frequency information acquisition unit acquires the frequency of occurrence (f1, f2, . . . , fn), in one or more sentence groups, of all the words belonging to each class.

Next, the class occurrence frequency information acquisition unit calculates the average frequency of occurrence of all the words in the class ((f1+f2+ . . . fn)/n) on a class-by-class basis. The class occurrence frequency information storage unit 110 is preferably a nonvolatile recording medium, but can be realized by a volatile recording medium. There is no limitation with respect to the process by which the class occurrence frequency information is stored in the class occurrence frequency information storage unit 110. However, usually, the class occurrence frequency information calculated by the class occurrence frequency information calculation unit 131 is accumulated in the class occurrence frequency information storage unit 110. However, the user may accumulate the class occurrence frequency information in the class occurrence frequency information storage unit 110 by manual entry.

The word pair acquisition unit 111 acquires any one of the one or more seed patterns stored in the seed pattern storage unit 104, and acquires, from the one or more sentence groups stored in the sentence group storage unit 101, one or more word pairs co-occurring with the acquired seed pattern. "A word pair co-occurs with a pattern such as a seed pattern" means that a pattern (a character string excluding word pairs) is present in a sentence and two words constituting a word pair appear in the sentence. For example, if the pattern is "X causes Y", the words "X" and "Y" co-occur with the pattern "X causes Y". If the seed pattern is "X causes Y", the word pair acquisition unit 111 acquires the word pair "virus" and "cold" from the sentence "virus causes cold" included in the one or more sentence groups. If the seed pattern is "Y caused by X" and a sentence included in the one or more sentence groups is "KOTSUJIKO NI YORU KEIZAITEKI NA SONGAI NI KANSHITE (regarding economic loss caused by traffic accidents)", the word pair acquisition unit 111 acquires the word pair "KOTSUJIKO (traffic accidents)" and "SON- GAI (loss)" by performing the following processing. That is, the word pair acquisition unit 111 recognizes that "NI YORU (caused by)" is present in "KOTSUJIKO NI YORU KEIZAITEKI NA SONGAI NI KANSHITE" by a language processing technique such as pattern matching. Next, the word pair acquisition unit 111 performs morphological analysis on the sentence "KOTSUJIKO NI YORU KEIZAITEKI NA SONGAI NI KANSHITE" included in the one or more sentence groups, and obtains "KOTSUJIKO|NI|YORU|KEIZAITEKI|NA|SONGAI|NI|KANSHITE", and the part of speech of each of the morphemes. Next, the word pair acquisition unit 111 performs dependency analysis to obtain dependency information (information indicated by the arrows) between the morphemes as shown in FIG. 4. Then, the word pair acquisition unit 111 acquires the noun "KOTSUJIKO (traffic accidents)" linked to "NI YORU (caused by)" and the noun "SONGAI (loss)" linked from "NI YORU (caused by)". The "KOTSUJIKO" and "SONGAI" constitute the word pair. Note that examples of the techniques for performing the above-described morphological analysis include JUMAN (see URL: http://nlp.kuee.kyoto-u.ac.jp/nl-resource/juman.html and ChaSen (see URL: http://chasen.naist.jp/hiki/ChaSen/) exist, which are publicly known. Also, examples of the techniques for performing dependency analysis include a Japanese syntactic analysis system KNP (see URL: http://nlp.kuee.kyoto-u.ac.jp/nl-resource/knp.html), which is publicly known.

It is more preferable that the word pair acquisition unit 111 acquires word pairs using any (usually, all) of the one or more seed patterns stored in the seed pattern storage unit 104 and the one or more patterns stored in the pattern storage unit 105. That is, it is more preferable that the word pair acquisition unit 111 sequentially acquires either the one or more seed patterns or the one or more patterns, and acquires one or more word pairs co-occurring with the seed pattern or the pattern from one or more sentence groups stored in the sentence group storage unit 101.

Alternatively, the word pair acquisition unit 111 may acquire word pairs without using any seed pattern or pattern. That is, the word pair acquisition unit 111 may acquire a pair of two words (usually, nouns) from each sentence included in the one or more sentence groups. In this case, the word pair acquisition unit 111 acquires one or more word pairs co-occurring in a single sentence.

The word pair acquisition unit 111 can be usually realized by an MPU, memory or the like. The processing procedure of the word pair acquisition unit 111 is usually implemented with software, and the software is stored in a storage medium such as a ROM. Note, however, that the processing procedure may also be implemented with hardware (a dedicated circuit).

The word pair accumulation unit 112 accumulates the one or more word pairs acquired by the word pair acquisition unit 111 in the word pair storage unit 102. The word pair accumulation unit 112 can be usually realized by an MPU, memory or the like. The processing procedure of the word pair accumulation unit 112 is usually implemented with software, and the software is stored in a storage medium such as a ROM. Note, however, that the processing procedure may also be implemented with hardware (a dedicated circuit).

The word class information acquisition unit 113 uses the one or more sentence groups in the sentence group storage unit 101 to acquire one or more pieces of word class information. The word class information acquisition unit 113 acquires, for example, all sets of verbs and postpositional particles or all verbs by performing morphological analysis on each sentence included in the one or more sentence groups. Also, the word class information acquisition unit 113 acquires, for example, all nouns (including noun phrases) by performing morphological analysis on each sentence included in the one or more sentence groups. Then, the word class information acquisition unit 113 calculates the number of times that or the rate at which the nouns co-occurs with the sets of verbs and postpositional particles or with the verbs, on a noun-by-noun basis. Next, the word class information acquisition unit 113 acquires a vector including, as an element, the number of times that or the rate at which the nouns co-occur with the sets of verbs and postpositional particles or with the verbs, on a noun-by-noun basis. Next, the word class information acquisition unit 113 acquires word class information, assuming that a set of nouns having vectors acquired therefor that are similar to each other to a degree higher than a predetermined degree is a noun set belonging to a single class. Note that the word class information is information including one or more words and a class identifier. The number of classes is large, such as, several hundreds or several thousands.

The word class information acquisition unit 113 can be usually realized by an MPU, memory or the like. The processing procedure of the word class information acquisition unit 113 is usually implemented with software, and the software is stored in a storage medium such as a ROM. Note, however, that the processing procedure may also be implemented with hardware (a dedicated circuit).

The word class information accumulation unit 114 accumulates the two or more pieces of word class information acquired by the word class information acquisition unit 113 in the word class information storage unit 103. The word class information accumulation unit 114 can be usually realized by an MPU, memory or the like. The processing procedure of the word class information accumulation unit 114 is usually implemented with software, and the software is stored in a storage medium such as a ROM. Note, however, that the processing procedure may also be implemented with hardware (a dedicated circuit).

The pattern acquisition unit 115 acquires a pattern from each sentence included in the one or more sentence groups stored in the sentence group storage unit 101. Specifically, for example, the pattern acquisition unit 115 performs morphological analysis and dependency analysis on each sentence included in one or more sentence groups stored in the sentence group storage unit 101, and acquires, taking the first noun (including a noun phrase) as a starting point and the second noun as an end point, a linkage of morphemes from the starting point to the end point as a pattern. Alternatively, it is more preferable that the pattern acquisition unit 115 acquires, as a pattern, a linkage of morphemes from the starting point to a morpheme where a linkage of morphemes starting from the starting point and a linkage of morphemes starting from the end point are linked. For example, when a sentence included in the one or more sentence groups is "KOTSUJIKO NI YORU KEIZAITEKI NA SONGAI NI KANSHITE (regarding economic loss caused by traffic accidents)", the pattern acquisition unit 115 performs morphological analysis on that sentence, and obtains "KOTSUJIKO|NI|YORU|KEIZAITEKI|NA|SONGAI|NI|KANSHITE". Also, the pattern acquisition unit 115 detects that the first noun "KOTSUJIKO (traffic accidents)" and the second noun "SONGAI (loss)" are nouns by morphological analysis. Then, the pattern acquisition unit 115 obtains the dependency information shown in FIG. 4 by dependency analysis. Next, the pattern acquisition unit 115 acquires, taking the first noun "KOTSUJIKO" as the starting point and the second noun "SONGAI" as the end point, the linkage of morphemes "Y caused by X" from the starting point to the end point as a pattern. Note that, here, the morpheme group "KEIZAITEKI NA (economic)" linked to the second noun "SONGAI (loss)" is deleted from the pattern. For example, when a sentence included in the one or more sentence groups is "KOTSUJIKO NI YORU KEIZAI NO SONGAI NI KANSHITE (regarding loss of economy caused by traffic accidents)", the pattern acquisition unit 115 performs morphological analysis on that sentence, and obtains "KOTSUJIKO|NI|YORU|KEIZAI|NO|SONGAI|NI|KANSHITE". The pattern acquisition unit 115 detects that the first noun "KOTSUJIKO (traffic accidents)", the second noun "KEIZAI (economy)", and the third noun "SONGAI (loss)" are nouns. Then, the pattern acquisition unit 115 acquires the dependency information shown in FIG. 5 by dependency analysis. Next, the pattern acquisition unit 115 acquires, as a pattern, a linkage of morphemes from the starting point, which is the first noun "KOTSUJIKO (traffic accidents)", to the morpheme "SONGAI (loss)", where a linkage of morphemes starting from the starting point and a linkage of morphemes starting from the end point, which is the second noun "KEIZAI (economy)", are linked. Here, the pattern acquisition unit 115 acquires "SONGAI (loss) of Y caused by X" as a pattern.

Further, the pattern acquisition unit 115 may acquire a pattern using two nouns (word pair) that have been provided. That is, for example, when the two nouns "KOTSUJIKO (traffic accidents)" and "SONGAI (loss)" are provided, the pattern acquisition unit 115 detects that "KOTSUJIKO" and "SONGAI" are contained in "KOTSUJIKO NI YORU KEIZAITEKI NA SONGAI NI KANSHITE". Then, the pattern acquisition unit 115 performs morphological analysis and dependency analysis on "KOTSUJIKO NI YORU KEIZAITEKI NA SONGAI NI KANSHITE", and obtains the dependency information shown in FIG. 4. Next, the pattern acquisition unit 115 acquires, taking the first noun "KOTSUJIKO" as a starting point and the second noun "SONGAI" as an end point, "Y caused by X", which is a linkage of morphemes from the starting point to the end point, as a pattern.

The pattern acquisition unit 115 can be usually realized by an MPU, memory or the like. The processing procedure of the pattern acquisition unit 115 is usually implemented with software, and the software is stored in a storage medium such as a ROM. Note, however, that the processing procedure may also be implemented with hardware (a dedicated circuit).

The pattern accumulation unit 116 accumulates the one or more patterns acquired by the pattern acquisition unit 115 in the pattern storage unit 105. The pattern accumulation unit 116 can be usually realized by an MPU, memory or the like. The processing procedure of the pattern accumulation unit 116 is usually implemented with software, and the software is stored in a storage medium such as a ROM. Note, however, that the processing procedure may also be implemented with hardware (a dedicated circuit).

The class pair favorableness degree calculation unit 117 calculates a class pair favorableness degree such that the class pair favorableness degree increases with an increase in the number of times that or the rate at which a pair of words respectively belonging to two classes co-occur with one or more seed patterns in one or more sentence groups in the sentence group storage unit 101. The class pair favorableness degree (CScore(ci,cj,P)) can be calculated, for example, using Expression 1 below. Note that the class pair favorableness degree indicates the appropriateness of the class pair in Expression 1, and therefore, if the class pair favorableness degree is an index indicating the inappropriateness of the class pair, then CScore(ci,cj,P) is a reciprocal of the calculation result of Expression 1, for example.

$$CScore(ci, cj, P) = \begin{cases} \dfrac{\sum\limits_{(ni,nj) \in ci \times cj} \|(ni, P, nj)\|}{\sum\limits_{(ni,nj) \in ci \times cj} \|(ni, *, nj)\|} & \text{if condition } \alpha \text{ holds} \\ 0 & \text{otherwise} \end{cases}$$ [Expression 1]

Here, ni and nj are nouns (words). ci and cj are classes. Further, P is a set of seed patterns. * represents an arbitrary pattern. Also, ‖(ni,P,nj)‖ is the frequency that the nouns ni and nj co-occur with a set of seed patterns. That is, "‖(ni,P,nj)‖=Σ$_{p \in P}$‖(ni,P,nj)‖". ‖(ni,*,nj)‖ is the frequency that the nouns ni and nj co-occur with an arbitrary pattern in one or more sentence groups (M). That is, "‖(ni,*,nj)‖=Σ$_{(ni,p,nj) \in M}$‖(ni,p,nj)‖". Accordingly, ‖(ni,*,nj)‖ is equal to the frequency that the nouns ni and nj simply co-occur.

Further, a represents a condition. Also, a is the condition that ni and ni have to co-occur with a prescribed number of different seed patterns. An examples of α is Expression 2. Expression 2 represents that ni and nj co-occur with β (for example, 3) or more different seed patterns. That is, if Expression 2 is the condition (a), the class pair favorableness degree of a word pair (ni and nj) that co-occurs only with two or less seed patterns is 0.

$$\|\{(p \in P | \exists (ni,nj) \in ci \times cj, (ni,p,nj) \in M\}\| \geq \beta$$ [Expression 2]

In Expression 2, M represents one or more sentence groups.

In Expression 1, the class pair favorableness degree (CScore(ci,cj,P)) is an example of the formula in which the level of the class pair favorableness degree increases with an increase in the number of times that or the rate at which words respectively belonging to two classes co-occur with one or more seed patterns. Expression 1 is an example of a formula in which the level of the class pair favorableness degree decreases with an increase in the number of times that words respectively belonging to two classes co-occur with a pattern other than seed patterns.

Note that in the case of using the degree of unfavorableness of the class pair instead of the class pair favorableness degree, the degree of unfavorableness of the class pair is calculated such that the degree of unfavorableness decreases with an increase in the number of times that or the rate at which words respectively belonging to two classes co-occur with one or more seed patterns. This case is also considered to be equivalent to a case where the class pair favorableness degree is calculated such that the class pair favorableness degree increases with an increase in the number of times that or the rate at which words respectively belonging to two classes co-occur with one or more seed patterns.

The class pair favorableness degree calculation unit 117 can be usually realized by an MPU, memory or the like. The processing procedure of the class pair favorableness degree calculation unit 117 is usually implemented with software, and the software is stored in a storage medium such as a ROM. Note, however, that the processing procedure may also be implemented with hardware (a dedicated circuit).

The class pair favorableness degree accumulation unit 118 accumulates the class pair favorableness degree calculated by the class pair favorableness degree calculation unit 117 in the class pair favorableness degree storage unit 106. The class pair favorableness degree accumulation unit 118 can be usually realized by an MPU, memory or the like. The processing procedure of the class pair favorableness degree accumulation unit 118 is usually implemented with software, and the software is stored in a storage medium such as a ROM. Note, however, that the processing procedure may also be implemented with hardware (a dedicated circuit).

The pattern similarity calculation unit 119 calculates the similarity between one or more seed patterns and each of the patterns stored in the pattern storage unit 105. Usually, the pattern similarity calculation unit 119 calculates the similarity such that the similarity between the seed pattern and the pattern increases with an increase in overlap between a class pair corresponding to a word pair co-occurring with the one or more seed patterns and a class pair corresponding to a word pair co-occurring with each of the one or more patterns The pattern similarity calculation unit 119 calculates the similarity between the seed pattern and the pattern, for example, using Expression 3, 4, 5, 6, or 7. That is, the similarity is, for example, $\text{Para}_1(p_{ci \times cj}, P)$, $\text{Para}_2(p_{ci \times cj}, P)$, $\text{Para}_3(p_{ci \times cj}, P)$, $\text{Para}_4(p_{ci \times cj}, P)$, or $\text{Para}_5(p_{ci \times cj}, P)$. In Expressions 3 to 7, P represents a set of seed patterns, and "p" represents any of the patterns. Usually, "p" may also be a seed pattern.

$$\text{Para}_1(p_{ci \times cj}, P) = \frac{\|I(p_{ci \times cj}) \cap I(P_{ci \times cj})\|}{\|I(p_{ci \times cj}) \cup I(P_{ci \times cj})\|} \quad \text{[Expression 3]}$$

In Expression 3, the similarity between the seed pattern and the pattern is $(\text{Para}_1(p_{ci \times cj}, P))$. "$I(p_{ci \times cj})$" represents a set of instances where a certain pattern "p" co-occurs with the words ni and nj belonging to the class ci and the class cj. "$I(p_{ci \times cj})$" is $\{(ni,nj) \in ci \times cj | (ni,p,nj) \in M\}$. "$(P_{ci \times cj})$" represents a set of instances where any of the seed patterns co-occurs with the words ni and nj belonging to the class ci and the class cj. Also, "$I(P_{ci \times cj}) = \cap_{p \in P} I(p_{ci \times cj})$". "$\|I(p_{ci \times cj}) \cup I(P_{ci \times cj})\|$" represents the number of instances of overlap between "$I(p_{ci \times cj})$" and "$(P_{ci \times cj})$". "$\|I(p_{ci \times cj}) \cup I(P_{ci \times cj})\|$" represents the number of instances in the union set of "$I(p_{ci \times cj})$" and "$(P_{ci \times cj})$".

$\text{Para}_1$ is calculated as a Jaccard coefficient between the words ni and nj belonging to the class ci and the class cj co-occurring with the pattern "p", and the words ni and nj belonging to the class ci and the class cj co-occurring with the set (P) of the seed patterns. With $\text{Para}_1$, it is possible to select appropriate classes from many word pairs "$p_{ci \times cj}$" that are class dependent and are generated using the pattern "p".

The use of Expression 3 enables the similarity to be calculated such that the similarity between the seed pattern and the pattern increases with an increase in overlap between a class pair corresponding to a word pair co-occurring with one or more seed patterns and a class pair corresponding to a word pair co-occurring with each of the one or more patterns. Further, the use of Expression 3 enables the similarity to be calculated such that the similarity decreases with an increase in the number of instances in the union set of "$I(p_{ci \times cj})$" and "$(P_{ci \times cj})$".

It is preferable that the pattern similarity calculation unit 119 excludes a pattern for which there is no intersection between "$I(p_{ci \times cj})$" and "$(P_{ci \times cj})$" (a pattern for which $\|I(p_{ci \times cj}) \cup I(P_{ci \times cj})\| = 0$) when the similarity between the seed pattern and the pattern is calculated, for example, using Expression 3. This can increase the processing speed.

As a modification of Expression 3, the similarity ($\text{Para}_3'$) between the seed pattern and the pattern may be calculated in the following manner.

That is, a vector Vp is configured for "p", where a word pair co-occurring with "p" is set as the element of the vector, and the number of word pairs co-occurring with the pattern "p" is set as the value of the element of the vector of that word pair. Then, a vector VP is configured for P, where a word pair co-occurring with the seed pattern P is set as the dimension of the vector, and the number of word pairs co-occurring with P is set as the value of the dimension of the vector of that word pair. Note, however, that the seed pattern P is a set and therefore the vector is created for each of "p"s of P, and the sum of the vectors is used as the vector of P.

Then, the distance or angle between these vectors is calculated. The distance can be calculated using $|Vp - VP|$ (the square root of the sum of the squares of difference between the values of the elements of the vectors Vp and VP).

The angle can be calculated using $Vp \cdot VP / |Vp| / |VP|$. Note that $Vp \cdot VP$ is the inner product (the sum of the products of the values of the elements of the vectors Vp and VP) and $|Vp|$ is the magnitude of the vector (the square root of the sum of the squares of the value of the element of the vector Vp).

This means that the similarity between the seed pattern and the pattern increases with an increase in similarity between the vector Vp and the vector VP, or in other words, the similarity between the seed pattern and the pattern increases with an increase in overlap with a class pair corresponding to a word pair co-occurring with each of the one or more patterns, as described above.

$$\text{Para}_2(p_{ci \times cj}, P) = \text{Para}_1(p_{ci \times cj}, P) \cdot \frac{\|I(p) \cap I(P)\|}{\|I(p) \cup I(P)\|} \quad \text{[Expression 4]}$$

In Expression 4, class-independent patterns are also used in calculation of the similarity. Expression 4 is a modification in which "$\text{Para}_1(p_{ci \times cj}, P)$" of Expression 3 is used. There exists a problem that coupling between sparse classes includes only a small amount of instances (called the "sparsity problem"). Expression 4 solves this sparsity problem. "I(p)" in Expression 4 represents a set of instances of word pairs co-occurring with the pattern "p" in the sentence group (M). "I(P)" represents a set of instances of word pairs co-occurring with the seed pattern P. Also, $\|I(p) \cup I(P)\|$ represents the number of instances of overlap between "I(p)" and "I(P)". $\|I(p) \cup I(P)\|$ represents the number of instances in the union set of "I(p)" and "I(P)". Note that Expression 4 supplements the Jaccard coefficient in the class pairs. That is, in Expression 4, calculation is not limited to word pairs included in classes, but is performed for all word pairs.

As in Expression 3, the similarity is also calculated in Expression 4 such that the similarity between the seed pattern and the pattern increases with an increase in overlap between a class pair corresponding to a word pair co-occurring with one or more seed patterns and a class pair corresponding to a word pair co-occurring with each of the one or more patterns. The similarity is also calculated such that the similarity decreases with an increase in the number of instances in the union set of "$I(p_{ci \times cj})$" and "$(P_{ci \times cj})$". With the use of Expression 4, the similarity can be calculated such that the similarity between the seed pattern and the pattern increases with an increase in the number of instances of overlap between "I(p)" and "I(P)". Furthermore, with the use of Expression 4, the similarity can be calculated such that the similarity decreases with an increase in the number of instances in the union set of "I(p)" and "I(P)".

$$\text{Para}_3(p_{ci \times cj}, P) = \frac{2 \cdot \|I(p_{ci \times cj}) \cap I(P_{ci \times cj})\|}{\|I(p_{ci \times cj})\| + \|I(P_{ci \times cj})\|} \quad \text{[Expression 5]}$$

In Expression 5, $\|I(p_{ci \times cj})\| + \|I(P_{ci \times cj})\|$ represents the sum of the number of sets of instances where a given pattern "p" co-occurs with the words ni and nj belonging to the class ci and the class cj, and the number of sets of instances where the seed pattern P co-occurs with the words ni and nj belonging to the class ci and the class cj. Note that as a modification of the expression, the denominator $\|I(p_{ci \times cj})\|$ of Para$_3$ may be modified, for example, to $\|I(p_{ci \times cj})\| \times \|I(P_{ci \times cj})\|$. Further, for the denominator of Para$_3$, $\|I(p_{ci \times cj})\|$ and $\|I(P_{ci \times cj})\|$ may be weighed, and addition or integration may be performed. That is, it is sufficient that Expression 5 is a decreasing function including $\|I(p_{ci \times cj})\|$ and $\|I(P_{ci \times cj})\|$ as parameters. Further, it is sufficient that Expression 5 is an increasing function including $\|I(p_{ci \times cj}) \cap I(P_{ci \times cj})\|$ as a parameter.

$$\text{Para}_4(p_{ci \times cj}, P) = \frac{\|I(p_{ci \times cj}) \cap I(P_{ci \times cj})\|}{\max(\|I(p_{ci \times cj})\|, \|I(P_{ci \times cj})\|)} \quad \text{[Expression 6]}$$

In Expression 6, $\max(\|I(p_{ci \times cj})\|, \|(P_{ci \times cj})\|)$ represents the larger of the number of sets of instances of co-occurrence between the words ni and nj belonging to the class ci and the class cj, and the number of sets of instances of co-occurrence of the seed pattern P with the words ni and nj belonging to the class ci and the class cj. It is sufficient that Expression 6 is an increasing function including $\|I(p_{ci \times cj}) \cap I(P_{ci \times cj})\|$ as a parameter.

$$\text{Para}_5(p_{ci \times cj}, P) = \quad \text{[Expression 7]}$$
$$\frac{1}{2}\left(D_{KL}\left(p_1 \| \frac{p_1 + p_2}{2}\right) + D_{KL}\left(p_2 \| \frac{p_1 + p_2}{2}\right)\right)$$

In Expression 7, $D_{KL}(p_1 \| p_2)$ is represented as in Expression 8. $D_{KL}(p_1 \| p_2)$ in Expression 8 represents the Kullback-Leibler divergence (also called the KL divergence) between the probability distributions $p_1$ and $p_2$. The Kullback-Leibler divergence is described, for example, in "Junichi Kazama, De Saeger, Stijn, Kentaro Torisawa, Masaki Murata "Creation of a large-scale synonym list using stochastic clustering of dependency" 15th annual meeting of The Association for Natural Language Processing (NLP2009)". Since the Kullback-Leibler divergence is known, the detailed description thereof has been omitted.

$$D_{KL}(p_1 \| p_2) = \sum_{(ni,nj)} p_1(ni, nj) \log_2 \frac{p_1(ni, nj)}{p_2(ni, nj)} \quad \text{[Expression 8]}$$

In Expressions 7 and 8, $p_1$ and $p_2$ represent the probability distributions in which the word pair (ni, nj) belonging to the class pair ci×cj co-occurs with $p_{ci \times cj}$. $p_2$ represents the probability distribution in which the word pair (ni, nj) belonging to the class pair ci×cj co-occurs with P.

Further, a vector Vp is created for "p", where a word pair co-occurring with the pattern "p" is set as the dimension of the vector, and the value obtained by dividing the number of word pairs co-occurring with "p" by the total number of appearance of "p" is set as the value of the dimension of the vector of that word pair. The value of the element (ni, nj) of each of the vectors is $p_1$(ni, nj).

Also, a vector VP is created for P, where a word pair co-occurring with the seed pattern P is set as the dimension of the vector, and the value obtained by dividing the number of word pairs co-occurring with P by the total number of appearance of P is set as the value of the dimension of the vector of that word pair. The value of the element (ni, nj) of each of the vectors is $p_2$(ni, nj).

Note that the KL divergence is also an index that takes large values of similarities between vectors. That is, for example, when $p_1$ and $p_2$ are the same in the KL divergence, $p_1/p_2$ of $D_{KL}$, is 1, $\log_2 p_1/p_2$ is 0, and the KL divergence is also 0. When $p_1$ and $p_2$ take different values, the final value of the KL divergence is a positive value.

The pattern similarity calculation unit 119 can be usually realized by an MPU, memory or the like. The processing procedure of the pattern similarity calculation unit 119 is usually implemented with software, and the software is stored in a storage medium such as a ROM. Note, however, that the processing procedure may also be implemented with hardware (a dedicated circuit).

The pattern similarity accumulation unit 120 accumulates the pattern similarity calculated by the pattern similarity calculation unit 119 in the pattern similarity storage unit 107 on a pattern-by-pattern basis.

The pattern similarity accumulation unit 120 can be usually realized by an MPU, memory or the like. The processing procedure of the pattern similarity accumulation unit 120 is usually implemented with software, and the software is stored in a storage medium such as a ROM. Note, however, that the processing procedure may also be implemented with hardware (a dedicated circuit).

The affinity information calculation unit 121 calculates the affinity information between the word pair and the pattern. Preferably, the affinity information calculation unit 121 calculates the affinity information such that the value of the affinity information increases with an increase in the number of times that or the rate at which one or more word pairs acquired by the word pair acquisition unit 111 co-occur with each of the one or more patterns. The affinity information calculation unit 121 calculates the affinity between the word pair and the pattern using, for example, Expression 9 or 10.

In Expression 9, the affinity information (Assoc$_1$) is a constant 1, and therefore, the affinity information is not taken into consideration as in a score calculation, described below.

In Expression 10, $\|(n,p,n')\|$ represents the frequency that the word pair (n,n') and the pattern "p" co-occur. That is, the affinity information calculation unit 121 calculates the affinity information such that the affinity information increases with an increase in this frequency. $\|(n,*,d)\|$ represents the frequency that the word pair (n, n') co-occurs with an arbitrary pattern (i.e., the frequency of the appearance of the word pair (n, n')). Further, $\|(*,p,*)\|$ represents the frequency of occurrence of the pattern "p". That is, the higher the frequency that the word pair (n, n') co-occurs with an arbitrary pattern, the smaller the value of the affinity information. Also, the higher the frequency of occurrence of the pattern "p", the smaller the value of the affinity information.

$$\text{Assoc}_1(n, p, n') = 1 \qquad \text{[Expression 9]}$$

$$\text{Assoc}_2(n, p, n') = \log\frac{\|(n, p, n')\|}{\|(n, *, n')\|\|(*, p, *)\|} \qquad \text{[Expression 10]}$$

The affinity information calculation unit 121 can be usually realized by an MPU, memory or the like. The processing procedure of the affinity information calculation unit 121 is usually implemented with software, and the software is stored in a storage medium such as a ROM. Note, however, that the processing procedure may also be implemented with hardware (a dedicated circuit).

The affinity information accumulation unit 122 accumulates the affinity information calculated by the affinity information calculation unit 121 in the affinity information storage unit 108. Usually, the affinity information accumulation unit 122 accumulates the word pair, the pattern, and the affinity information in association with each other in the affinity information storage unit 108. The affinity information accumulation unit 122 can be usually realized by an MPU, memory or the like. The processing procedure of the affinity information accumulation unit 122 is usually implemented with software, and the software is stored in a storage medium such as a ROM. Note, however, that the processing procedure may also be implemented with hardware (a dedicated circuit).

The class pair favorableness degree acquisition unit 123 acquires, from the class pair favorableness degree storage unit 106, the class pair favorableness degree of the two classes to which the words included in the one or more word pairs acquired by the word pair acquisition unit 111 belong to. Here, usually, the class pair favorableness degree acquisition unit 123 acquires, from the word class information storage unit 103, a class identifier pair (two class identifiers) serving as two class identifiers for two classes, and acquires the class pair favorableness degree corresponding to that class identifier pair from the class pair favorableness degree storage unit 106. The class pair favorableness degree acquisition unit 123 can be usually realized by an MPU, memory or the like. The processing procedure of the class pair favorableness degree acquisition unit 123 is usually implemented with software, and the software is stored in a storage medium such as a ROM. Note, however, that the processing procedure may also be implemented with hardware (a dedicated circuit).

The pattern similarity acquisition unit 124 acquires the similarity between the seed pattern and the pattern from the pattern similarity storage unit 107. The pattern similarity acquisition unit 124 acquires, for example, the similarity corresponding to a pattern identifier for identifying a pattern for which the score is to be calculated, from the pattern similarity storage unit 107. The pattern similarity acquisition unit 124 can be usually realized by an MPU, memory or the like. The processing procedure of the pattern similarity acquisition unit 124 is usually implemented with software, and the software is stored in a storage medium such as a ROM. Note, however, that the processing procedure may also be implemented with hardware (a dedicated circuit).

The affinity information acquisition unit 125 acquires the affinity information from the affinity information storage unit 108. The affinity information acquisition unit 125 acquires, for example, the affinity information corresponding to a pattern for which the score is to be calculated and a word pair for which the score is to be calculated from the affinity information storage unit 108. The affinity information acquisition unit 125 can be usually realized by an MPU, memory or the like. The processing procedure of the affinity information acquisition unit 125 is usually implemented with software, and the software is stored in a storage medium such as a ROM. Note, however, that the processing procedure may also be implemented with hardware (a dedicated circuit).

The score determination unit 126 uses the class pair favorableness degree acquired by the class pair favorableness degree acquisition unit 123 to determine the score of each of the word pairs acquired by the word pair acquisition unit 111. The score determination unit 126 determines the score using an operation expression in which the class pair favorableness degree is an increasing function. It is also preferable that the score determination unit 126 also uses the similarity between each of the one or more patterns and the seed pattern that is stored in the pattern similarity storage unit 107 to determine the score of each of the word pairs acquired by the word pair acquisition unit 111. In this case, the score determination unit 126 determines the score using an operation expression in which the similarity is an increasing function. It is also preferable that the score determination unit 126 also uses the affinity information in the affinity information storage unit 108 to determine the score of each of the word pairs acquired by the word pair acquisition unit 111. In this case, the score determination unit 126 determines the score using an operation expression in which the affinity information is an increasing function.

It is also preferable that the score determination unit 126 determines, as a score of each of the word pairs, the score of the seed pattern or the pattern that exhibits a maximum value of the product of the class pair favorableness degree, the similarity between the seed pattern and the pattern, and the affinity information as shown in Expression 11.

$$\text{Score}(ni, nj, P) = \qquad \text{[Expression 11]}$$
$$\max_{ci \in classes(ni), cj \in classes(nj), (ni, p, nj) \in M} \{CScore(ci, cj, P) \cdot$$
$$\text{Para}(p_{ci} \times_{cj}, P) \cdot \text{Assoc}(ni, p, nj)\}$$

The score determination unit 126 may apply any of $\text{Para}_1$ to $\text{Para}_5$ described above to Para in Expression 11, for example. Also, the score determination unit 126 may apply either $\text{Assoc}_1$ or $\text{Assoc}_2$ described above to Assoc in Expression 11. That is, more specifically, Expression 11 may be Expression 12, 13, or 14, for example. In Expressions 12 to 14, arguments and the operator "max" have been omitted. Note that a method for calculating scores using Expression 12 is referred to as "Class Dependent I (CD-I)". A method for calculating scores using Expression 13 is referred to as "Class Dependent II (CD-II)". Further, a method for calculating scores using Expression 14 is referred to as "Class Dependent III (CD-III)".

$$\text{Score} = C\text{Score} - \text{Para}_1 - \text{Assoc}_1 \qquad \text{[Expression 12]}$$

$$\text{Score} = C\text{Score} - \text{Para}_1 - \text{Assoc}_2 \qquad \text{[Expression 13]}$$

$$\text{Score} = C\text{Score} - \text{Para}_2 - \text{Assoc}_2 \qquad \text{[Expression 14]}$$

In Expressions 11 to 14, scores are calculated from the product of three values, namely, Cscore, Para, and Assoc. However, the scores may be calculated from the sum of the three values, or may be calculated using $\text{Cscore}^2 \times \text{Para} \times \text{Assoc}$. That is, it is sufficient that the scores are calculated using Cscore, Para, and Assoc as parameters. Usually, the greater Cscore is, the greater the value of the score is, the greater Para is, the greater the value of the score is, and the greater Assoc is, the greater the value of the score is.

The score determination unit 126 can be usually realized by an MPU, memory or the like. The processing procedure of the score determination unit 126 is usually implemented with software, and the software is stored in a storage medium such as a ROM. Note, however, that the processing procedure may also be implemented with hardware (a dedicated circuit).

The word pair selection unit 127 acquires one or more word pairs having a score that has been determined by the score determination unit 126 that is high enough to satisfy a predetermined condition. Usually, the word pair selection unit 127 sorts word pairs by the scores, and acquires a word pair having a score equal to or greater than a threshold, for example. Alternatively, the word pair selection unit 127 may sort word pairs by the scores, and may acquire, for example, word pairs having a score that is ranked within a predetermined number (e.g., 1000) of ranks from the top. Also, the word pair selection unit 127 may sort word pair by the scores, and the word pair output unit 128 may output all the word pairs in the descending order of the rank of scores from the top, for example. In this case as well, the word pair selection unit 127 acquires one or more word pairs, and the word pair output unit 128 outputs the one or more word pairs.

The word pair selection unit 127 can be usually realized by an MPU, memory or the like. The processing procedure of the word pair selection unit 127 is usually implemented with software, and the software is stored in a storage medium such as a ROM. Note, however, that the processing procedure may also be implemented with hardware (a dedicated circuit).

The word pair output unit 128 outputs the one or more word pairs acquired by the word pair selection unit 127. Here, "output" represents a concept that includes output to a display, projection by a projector, printing with a printer, outputting a sound, sending to an outside device, accumulation in a recording medium, delivery of processing results to other processing apparatuses or other programs. The word pair output unit 128 may be considered to include, or not to include, an output device such as a display or a loudspeaker. The word pair output unit 128 can be realized, for example, by driver software for an output device, or a combination of driver software for an output device and the output device.

The word pair exclusion unit 129 excludes, from the word pairs that are to be output, a word pair corresponding to any of the one or more excluded class pairs stored in the excluded class pair storage unit 109. Usually, the word pair output unit 128 does not output the word pairs excluded by the word pair exclusion unit 129. To "exclude" as used herein usually means to "delete". However, to "exclude" also may include decreasing the score, and reducing the rank of the relevant word pair (e.g., reducing the rank to the lowest rank), for example. The word pair exclusion unit 129 can be usually realized by an MPU, memory or the like. The processing procedure of the word pair exclusion unit 129 is usually implemented with software, and the software is stored in a storage medium such as a ROM. Note, however, that the processing procedure may also be implemented with hardware (a dedicated circuit).

The excluded class pair accumulation unit 130 accumulates class identifiers for two classes having a difference equal to or greater than a predetermined threshold in the average frequency of occurrence as an excluded class pair in the excluded class pair storage unit 109. The threshold is 25-fold, for example. The excluded class pair accumulation unit 130 can be usually realized by an MPU, memory or the like. The processing procedure of the excluded class pair accumulation unit 130 is usually implemented with software, and the software is stored in a storage medium such as a ROM. Note, however, that the processing procedure may also be implemented with hardware (a dedicated circuit).

Next, the operation of the word pair acquisition apparatus 1 will be described with reference to the flowchart in FIG. 6. Referring to the flowchart shown in FIG. 6, a description will be given of the processing for outputting word pairs having a prescribed relationship after storing, in each of the components of the word pair storage unit 102, the word class information storage unit 103, the seed pattern storage unit 104, the pattern storage unit 105, the class pair favorableness degree storage unit 106, the pattern similarity storage unit 107, the affinity information storage unit 108, and the excluded class pair storage unit 109, the information that can be stored in these components.

(Step S601) The score determination unit 126 assigns "1" to a counter i.

(Step S602) The score determination unit 126 determines whether the ith word pair is present in the word pairs in the word pair storage unit 102 or in the word pairs acquired by the word pair acquisition unit 111. If the ith word pair is present, the procedure moves to step S603. If the ith word pair is not present, the procedure moves to step S618.

(Step S603) The score determination unit 126 acquires the ith word pair.

(Step S604) The score determination unit 126 acquires the class pair corresponding to the ith word pair. Here, the "class pair" may be two class identifiers.

(Step S605) The score determination unit 126 determines whether the class pair acquired in step S604 is the excluded class pair stored in the excluded class pair storage unit 109. If it is the excluded class pair, the procedure moves to step S617, and if it is not the excluded class pair, the procedure moves to step S606.

(Step S606) The score determination unit 126 acquires, from the class pair favorableness degree storage unit 106, the class pair favorableness degree corresponding to the class pair acquired in step S604.

(Step S607) The score determination unit 126 assigns "1" to a counter j.

(Step S608) The score determination unit 126 determines whether the jth pattern is present in the pattern storage unit 105 or the seed pattern storage unit 104. If the jth pattern is present, the procedure moves to step S609, and if it is not present, the procedure moves to step S615.

(Step S609) The score determination unit 126 acquires the jth pattern from the pattern storage unit 105 or the seed pattern storage unit 104.

(Step S610) The score determination unit 126 acquires the similarity corresponding to the jth pattern from the pattern similarity storage unit 107.

(Step S611) The score determination unit 126 acquires the affinity information corresponding to the ith word pair and the jth pattern from the affinity information storage unit 108.

(Step S612) The score determination unit 126 uses the class pair favorableness degree acquired in step S606, the similarity acquired in step S610, and the affinity information acquired in step S611 to calculate the score corresponding to the ith word pair and the jth pattern.

(Step S613) The score determination unit 126 temporarily accumulates, in a buffer, the score corresponding to the jth pattern, calculated in step S612.

(Step S614) The score determination unit 126 increments the counter j by 1. The procedure returns to step S608.

(Step S615) The score determination unit 126 acquires the maximum score in the scores temporarily accumulated in the buffer in step S613.

(Step S616) The score determination unit 126 accumulates the score acquired in step S615 in association with the ith word pair.

(Step S617) The score determination unit 126 increments the counter i by 1. The procedure returns to step S602.

(Step S618) The word pair selection unit 127 sorts the word pairs by the score accumulated in step S616 as a key.

(Step S619) The word pair selection unit 127 acquires, from the word pairs sorted in step S618, one or more word pairs having a score that is high enough to satisfy the predetermined condition.

(Step S620) The word pair output unit 128 outputs the one or more word pairs acquired in step S619, and the processing ends.

Although not described with reference to the flowchart in FIG. 6, the word pair in the word pair storage unit 102, the word class information in the word class information storage unit 103, the seed pattern in the seed pattern storage unit 104, the pattern in the pattern storage unit 105, the class pair favorableness degree in the class pair favorableness degree storage unit 106, the similarity in the pattern similarity storage unit 107, the affinity information in the affinity information storage unit 108, and the excluded class pair in the excluded class pair storage unit 109 are each stored by the processing described above.

In the flowchart shown in FIG. 6, the exclusion of the word pair corresponding to the excluded class pair from the processing is performed in step S605. However, the processing for excluding the word pair belonging to the excluded class pair from the word pairs that are to be output may be performed at another timing (e.g., immediately before output).

The following is a description of a specific operation of the word pair acquisition apparatus 1 according to this embodiment. Let us now assume that one or more web pages on the web are stored in the sentence group storage unit 101. Also, a large number of pairs of words, which are nouns acquired from the one or more web pages, are stored in the word pair storage unit 102.

The word class information storage unit 103 holds, for example, a word class information management table as shown in FIG. 7. The word class information management table shown in FIG. 7 indicates the word class information of the class identifiers "$C_{290}$" and "$C_{471}$" only. A single word may belong to a plurality of classes. Note that this word class information management table is information that has been acquired, for example, by the word class information acquisition unit 113 performing the above-described processing.

The class occurrence frequency information storage unit 110 holds a class occurrence frequency information management table as shown in FIG. 8. The class occurrence frequency information management table is a record including "class" and "average frequency of occurrence". "class" is a class identifier. "average frequency of occurrence" is an average frequency of occurrence of a word pair belonging to classes identified by class identifiers.

Three experiments were performed in the above-described situation. Experiment 1 is an experiment of acquiring word pairs each consisting of cause and effect. Experiment 2 is an experiment of acquiring word pairs each consisting of a product and the material. Experiment 3 is an experiment of acquiring word pairs each consisting of a phenomenon and the preventing means.

In the three experiments, an experiment for comparing four baseline methods with methods using the word pair acquisition apparatus 1 of the present invention was performed. The first method of the four baseline methods is the method called "Espresso (ESP) (see Non-Patent Document 1). As described above, in ESP, a small amount of word pairs that are desired to be extracted is provided and patterns are acquired from the word pairs. A conventional word pair acquisition apparatus acquires word pairs co-occurring with the acquired pattern. Also, ESP is an iterative bootstrapping method.

The second method of the four baseline methods is a method that does not use classes unlike the word pair acquisition apparatus 1. That is, the second method is referred to as "Single Class (SC)," in which the scores of word pairs are calculated using Expression 15.

$$\text{Score}(n, n', P) = \max_{(n,p,n') \in M} \left\{ \frac{\|I(p) \cap I(P)\|}{\|I(p) \cup I(P)\|} \cdot \text{Assoc}_2(n, p, n') \right\} \quad \text{[Expression 15]}$$

In Expression 15, "I(p)" represents the instances of a word pair co-occurring with the pattern "p", and "RP)" represents the instances of a word pair co-occurring with the seed pattern P. ‖I(p)∩I(P)‖ represents the number of instances of overlap between "I(p)" and "I(P)" (difference sets). ‖I(p)∐I(P)‖ represents the number of instances in the union set of "I(p)" and "I(P)".

The third and fourth methods of the four baseline methods are random baseline methods. The third method is referred to as "R-I". RI is a method in which word pairs co-occurring with a pattern "p" are acquired from one or more sentence groups. The fourth method is referred to as "R-II". R-II is a method in which word pairs co-occurring with the seed pattern P are acquired from one or more sentence groups.

The methods using the word pair acquisition apparatus 1 are the above-described three methods CD-I, CD-II, and CD-III.

In each of the three experiments, the same seed patterns are provided for all methods. However, different seed patterns are, of course, used for the three experiments. Three judges judged whether the word pairs respectively output by the methods were correct or not.

In each of the methods, a set of ranked word pairs, which was an output, was divided into segments. The segments include the top 5000 segments, the segments ranked from 5000 to 15000 from the top, the segments ranked from 15000 to 35000 from the top, and the segments ranked from 35000 to 75000 from the top. Also, in each of the methods, 100 samples of word pairs were randomly acquired from each of the segments. Then, in all the segments, the accuracy rate (hereinafter, also referred to as "precision") at which word pairs are word pairs having a prescribed relationship was calculated. Here, two evaluation criteria were applied in the experiments. The first criterion is "strict" judgment in which a word pair is regarded as correct only when the three judges have judged the word pair to be correct, and the second criterion is "lenient" judgment in which a word pair is regarded as correct also when a majority (two) of the three judges have judged the word pair to be correct. For evaluation, a stop word list of 500 word pairs was used. By doing so, it was possible to exclude pairs of pronouns, pairs of nominalizations, and pairs of stop words from the output of each of the methods.

Experiment 1

Experiment 1 is an experiment of acquiring word pairs each consisting of cause and effect. In Experiment 1, 20 seed patterns, including, for example, "X causes Y" and "X results in Y", were stored in the seed pattern storage unit 104.

With the CD-III method using the word pair acquisition apparatus 1, output of word pairs and the like as shown in FIG. 9 was obtained. FIG. 9 shows class pairs, ranks, and word pairs. The ranks were determined according to the score. In the case of using CD-III, unexpected word pairs were able to be acquired from the Web (one or more sentence groups). This indicates that unknown useful word pairs (word pairs each consisting of effect and cause) can be acquired from the Web. FIG. 10 is a graph showing the precision of each of the methods in Experiment 1. In FIG. 10, the horizontal axis (Samples Ranked by Score) denotes samples (word pairs) ranked according to the score, and the vertical axis (Precision (%)) denotes the accuracy rate of the word pairs. According to FIG. 10, with the CD-III method (lenient case) using the word pair acquisition apparatus 1, the precision of the top 60,000 word pairs is 70% or higher, and the precision of the top 30,000 word pairs is 80% or higher. This indicates that the precision of CD-III is very high, compared to those of ESP and SC. Furthermore, for the top 5000 segments, CD-II (lenient case) has achieved a precision of about 93%. As such, it can be said that the methods using classes, such as CD-II and CD-III, are very effective.

Here, when the seed patterns "X causes Y" and "X results in Y" were used, 32,213 word pairs (excluding 20,687 stop words) were able to be acquired in the word pair acquisition apparatus 1. Further, the words were able to be classified into 1,282 classes. Note that a "stop word" is a word that is to be excluded from output.

Further, with Espresso, in which eight replicates were performed, 1,520,662 word pairs were able to be acquired using the pattern "Y caused by X".

With R-I (completely random baseline method), any word pair having the relationship between cause and effect was not be able to be acquired from randomly acquired 100 tuples of (n, p, n'). With the R-II method, 100 tuples were randomly selected from 20,678 tuples co-occurring with seed patterns, and as a result, the precision was 46% for the strict case and 71% for the lenient case. Both of these methods were found to be inferior to the method using the word pair acquisition apparatus 1.

Experiment 2

Experiment 2 is an experiment of acquiring word pairs each consisting of a product and the material. In Experiment 2, 14 seed patterns, including, for example, "Y is made of X" and "X is the material of Y" were stored in the seed pattern storage unit 104.

Then, for example, output of word pairs and the like as shown in FIG. 11 was obtained using the word pair acquisition apparatus 1. The word pair acquisition unit 111 of the word pair acquisition apparatus 1 was able to acquire 11,471 word pairs (after excluding 8,633 stop words). Also, the word pair acquisition apparatus 1 acquired 620 class pairs.

FIG. 12 is a graph showing the precision of each of the methods in Experiment 2. FIG. 12 indicates that the precision of the CD-III method (lenient case) using the word pair acquisition apparatus 1 for the top 30,000 samples (segments) was 80% or higher. On the other hand, the precision of Espresso (lenient case) was about 50%, and the CD-III method was superior to Espresso by 30% or greater.

CD-I and CD-II, which are the class-dependent methods, exhibit excellent result for the higher rank segments. However, with CD-I and CD-II, the precision has sharply decreased for the lower rank segments. Note that Espresso (lenient case) is superior to CD-I (lenient case) with respect to the lower rank segments (about 30,000).

Additionally, with R-I, it was not possible to acquire any correct word pair. With R-II, word pairs were acquired with a precision of 59% for the strict case, and with a precision of 72% for the lenient case.

Experiment 3

Experiment 3 is an experiment of acquiring word pairs each consisting of a phenomenon and the preventing means. In Experiment 3, 20 seed patterns, including, for example, "Y is prevented by X" and "X that prevents Y" were stored in the seed pattern storage unit 104.

With the method using the word pair acquisition apparatus 1, for example, output of word pairs and the like as shown in FIG. 13 was obtained. The word pair acquisition unit 111 of the word pair acquisition apparatus 1 was able to acquire 18,512 word pairs (after excluding 9,946 stop words). Also, the word pair acquisition apparatus 1 acquired 1,161 class pairs.

FIG. 14 is a graph showing the precision of each of the methods in Experiment 3. FIG. 12 indicates that the CD-III method using the word pair acquisition apparatus 1 is superior to Espresso and SC for the two top segments (the top 5,000 segments and the segments ranked from 5,000 to 15,000). In Experiment 3, only CD-III of the methods using the word pair acquisition apparatus 1 was evaluated. In Experiment 3, the word pair acquisition apparatus 1 was evaluated also using methods (CD-IIIa, CD-IIIb) extended from the CD-III method. The reason that the extended methods were used was that word pairs acquired using patterns including seed patterns contained words representing actions that are to be prevented, rather than concrete preventing means. For example, the word pairs acquired by the word pair acquisition apparatus 1 contained the word pair "hanger" and "means" in "means that prevents hunger" and the word pair "mechanism" and "leakage" in "mechanism that prevents leakage", corresponding to the pattern "X that prevents Y". "means", "mechanism" and the like were excluded as inappropriate words. This corresponds to, for example, determination of word pairs that are not to be adopted, using the excluded class pair in the excluded class pair storage unit 109 described above.

CD-IIIa is similar to CD-III, but is different in that word pairs corresponding to the excluded class pairs in the excluded class pair storage unit 109 are excluded. In CD-IIIa, class identifiers for two classes having a difference equal to greater than a predetermined threshold in the average frequency of occurrence are regarded as an excluded class pair. Here, the threshold is 25-fold. The excluded class pair is used because a word belonging to a class to which words having a very high frequency of occurrence belong tend not to be a word constituting a favorable word pair having a prescribed relationship. In the case of using the average frequency of occurrence management table shown in FIG. 8, the difference in the average frequency of occurrence between class 9 and class 49 is 25-fold or greater (about 135-fold), and therefore class 9 and class 49 are regarded as an excluded class pair.

As with CD-IIIa, CD-IIIb is also similar to CD-III, but is different in that word pairs corresponding to the excluded class pairs in the excluded class pair storage unit 109 are excluded. In CD-IIIb, nine excluded class pairs are provided by manual operation. The experimenter checked the output of CD-III, and determined the nine excluded class pairs. Referring to FIG. 14, CD-IIIb exhibited favorable results for the most part.

Additionally, with R-I, for both of the strict and lenient cases, it was not possible to acquire any correct word pair from 100 samples. With R-II, word pairs were acquired with a precision of 59% for the strict case, and a precision of 68% for the lenient case.

As described above, this embodiment makes it possible to acquire word pairs having a prescribed relationship with high precision.

Note that in this embodiment, the score of the word pair may be calculated using only the class pair favorableness degree. In this case, for example, the score may match the class pair favorableness degree. Then, the word pair acquisition apparatus 1 is a word pair acquisition apparatus including: a sentence group storage unit in which one or more sentence groups can be stored; a word class information storage unit in which can be stored two or more pieces of word class information each including, in association with each other, one or more words and a class identifier for identifying a class to which the one or more words belong; a seed pattern storage unit in which can be stored one or more seed patterns each serving as a pattern used for acquiring two word pairs having a prescribed relationship; a word pair acquisition unit that acquires any of the one or more seed patterns stored in the seed pattern storage unit, and acquires, from the one or more sentence groups stored in the sentence group storage unit, one or more word pairs co-occurring with the acquired seed pattern; a class pair favorableness degree acquisition unit that acquires, from the class pair favorableness degree storage unit, a class pair favorableness degree of two classes to which the words included in the one or more word pairs acquired by the word pair acquisition unit respectively belong; a score determination unit that uses the class pair favorableness degree acquired by the class pair favorableness degree acquisition unit to determine a score of each of the word pairs acquired by the word pair acquisition unit; a word pair selection unit that acquires one or more word pairs having a score that has been determined by the score determination unit that is high enough to satisfy a predetermined condition; and a word pair output unit that outputs the one or more word pairs acquired by the word pair selection unit.

In this embodiment, the probability distribution information may be stored in the word class information storage unit 103 on a word-by-word basis. The probability distribution information is information on a distribution (set) of probabilities that words belong to each of one or more classes. The probability distribution information may constitute a vector. A "class" is an information group including one or more nouns, or an information group including one or more abstractions of nouns. The class is a set of nouns that tend to co-occur with, for example, the same verb, or a set of the same verb and a postpositional particle. The class may be referred to as a "hidden class" where necessary. In this case, the word class information included in the word class information storage unit 103 is as shown in FIG. 15. FIG. 15 shows a probability distribution management table. Although each piece of the data in the probability distribution management table is a vector including probabilities that the words respectively belong to the classes, this vector can also be considered as a type of word class information including, in association with each other, one or more words and a class identifier for the class to which the one or more words belong. In FIG. 15, the class identifier is determined by the number of elements within each vector.

Also, the word class information acquisition unit 113 may use one or more sentence groups in the sentence group storage unit 101 to construct a probability distribution management table as shown in FIG. 15. More specifically, using, for example, 1,000,000 noun phrases and a set of 100,000 verbs and postpositional particles, a probability "P(<v, rel>|n)" is acquired from one or more sentence groups (the following web corpus published by Shinzato et. al, "K. Shinzato, D. Kawahara, C. Hashimoto and S. Kurohashi. 2008. A Large-Scale Web Data Collection as A Natural Language Processing Infrastructure. In the 6th International Conference on Language Resources and Evaluation (LREC)". Note that the conditional probability "P(<v,rel>|n)" of the occurrence of sets of <v, rel> can be calculated using Expression 16 below. "P(<v, rel>|n)" represents a probability distribution of the grammatical context of the noun "n". Note that "v" represents a verb, "rel" represents a postpositional particle, and "n" represents a noun (including a noun phrase). Additionally, a noun corresponds to a word. It is assumed that if a clause composed of the noun "n" and the postpositional particle rel modifies a clause containing the verb "v", then "the noun n co-occurs with <v,rel>".

$$P(\langle v, \text{rel}\rangle | n) = \frac{\log(f(\langle v, \text{rel}, n\rangle)) + 1}{\sum_{\langle v,rel\rangle \in D} \log(f(\langle v, \text{rel}, n\rangle)) + 1} \quad \text{[Expression 16]}$$

if $f(\langle v, \text{rel}, n\rangle) > 0$,

Although "log" is used in Expression 16, "log" does not need to be used. Accordingly, Expression 16 may be "P(<v,rel>|n)=(f(<v,rel,n>)+1)/(Σf(<v,rel,n>)+1).

In Expression 16, "f(<v,rel,n>)" represents the frequency of occurrence of <v,rel,n>. D represents a set defined as {<v,rel>|f(<v,rel,n>)>0}. If "f(<v,rel,n>)=0", "P(<v,rel>|n)" is "0".

The word class information acquisition unit 113 may classify nouns with a classification method called "EM-based clustering". That is, the word class information acquisition unit 113 calculates the probability of occurrence of a set of <v,rel,n> expressed by Expression 17 below.

$$P(\langle v,rel,n\rangle) =_{def} \Sigma_{a \in A} P(\langle v,rel\rangle | a) P(n|a) P(a), \quad \text{[Expression 17]}$$

In Expression 17, "a" represents a hidden class of a set of <v,rel> and "n". In Expression 17, the probabilities "P(<v, rel>|a)", "P(n|a)", and "P(a)" cannot be directly calculated. This is because the hidden class "a" cannot be acquired from the provided corpus.

"EM-based clustering" estimates these probabilities ("P (<v,rel>|a)", "P(n|a)", and "P(a)") from a corpus (one or more sentence groups) that is provided. "EM-based clustering" is composed of two steps, namely, "E step" and "M step". In "E step", the probability "P(<v,rel>|a)" is calculated. In "M step", using the result obtained in "E step", "P(<v,rel>|a)", "P(n|a)", and "P(a)" are updated to the maximum likelihood.

By the above-described processing, the probabilities "P(<v,rel>|a)", "P(n|a)", and "P(a)" are calculated for <v,rel>, "n", and "a", respectively.

Then, "P(a|n)" is calculated using Expression 18 below.

$$P(a | n) = \frac{P(n | a)P(a)}{\sum_{a \in A} P(n | a)P(a)}. \quad \text{[Expression 18]}$$

"P(a|n)" is used for determining the class of "n". For example, a class having a maximum "P(a|n)" is the class to which "n" belongs. Noun phrases co-occurring with similar sets of <v,rel> tend to belong to the same class.

Further, it is preferable that the class pairs described herein are narrowed down in the following manner. That is, with the use of means not shown in the drawings or any of the above-described components (the matters specifying the invention), a word pair co-occurring with a seed pattern is extracted from a sentence group in the sentence group storage unit 101, and the class pairs are limited to those class pairs in which that word pairs are present in a predetermined number (the threshold is stored in advance) or greater. Then, the limited class pairs, or word pairs in the limited class pairs are used to perform the above-described processing (the processing for acquiring word pairs, the calculation of the class pair favorableness degree, the calculation of similarities between patterns, the calculation of scores, and the like). This can increase the processing speed.

It should be appreciated that some modifications may be made to the various expressions described herein within the technical scope of the invention.

The processing in this embodiment may be implemented with software. The software may be distributed by software downloading or the like. The software may be distributed in the form where the software is stored in a storage medium such as a CD-ROM. Note that the same is applied to the other embodiments described in this specification. The software that implements the information processing apparatus in this embodiment may be a following program. That is, this program is a program, with one or more sentence groups; two or more pieces of word class information each including, in association with each other, one or more words and a class identifier for identifying a class to which the one or more words belong; a class pair favorableness degree serving as an index indicating the appropriateness of two classes; and one or more seed patterns each serving as a pattern used for acquiring two word pairs having a prescribed relationship being stored in a storage medium, for causing a computer to function as: a word pair acquisition unit that acquires any of the one or more seed patterns stored in the storage medium, and acquires one or more word pairs co-occurring with the acquired seed pattern from the one or more sentence groups stored in the storage medium; a class pair favorableness degree acquisition unit that acquires, from the storage medium, a class pair favorableness degree of two classes to which words included in the one or more word pairs acquired by the word pair acquisition unit respectively belong; a score determination unit that uses the class pair favorableness degree acquired by the class pair favorableness degree acquisition unit to determine a score of each of the word pairs acquired by the word pair acquisition unit; a word pair selection unit that acquires one or more word pairs having a score that has been determined by the score determination unit that is high enough to satisfy a predetermined condition; and a word pair output unit that outputs the one or more word pairs acquired by the word pair selection unit.

With the above-described program, it is preferable to cause the computer to further function as a class pair favorableness degree calculation unit that calculates a class pair favorableness degree such that the class pair favorableness degree increases with an increase in the number of times that or the rate at which word pairs respectively belonging to two classes co-occur with the one or more seed patterns in the one or more sentence groups in the sentence group storage unit, wherein the class pair favorableness degree of the two classes calculated by the class pair favorableness degree calculation unit is the class pair favorableness degree stored in the storage medium.

It is preferable that the above-described program is a program, with one or more patterns that are not a seed pattern and are used for acquiring two word pairs having the prescribed relationship, and a similarity between each of the one or more patterns and the seed pattern on a pattern-by-pattern basis being further stored in the storage medium, for causing the computer to function such that the word pair acquisition unit acquires either the one or more seed patterns stored in the storage medium or the one or more patterns stored in the storage medium, and acquires, from the one or more sentence groups stored in the storage medium, one or more word pairs co-occurring with the seed patterns or the patterns, wherein the score determination unit also uses the similarity between each of the one or more patterns and the seed patterns that is stored in the storage medium to determine a score of each of the word pairs acquired by the word pair acquisition unit.

With the above-described program, it is preferable to cause the computer to further function as a pattern similarity calculation unit that calculates a similarity such that the similarity increases with an increase in overlap between a class pair corresponding to a word pair co-occurring with the one or more seed patterns and a class pair corresponding to a word pair co-occurring with each of the one or more patterns stored in the storage medium, wherein the similarity calculated by the pattern similarity calculation unit is the similarity stored in the storage medium.

It is preferable that the above-described program is a program, with affinity information serving as information relating to the affinity between each of the one or more word pairs and each of the one or more patterns being further stored in the storage medium, for causing the computer to function such that the score determination unit also uses the affinity information in the storage medium to determine a score of each of the word pairs acquired by the word pair acquisition unit.

With the above-described program, it is preferable to cause the computer to further function as an affinity information calculation unit that calculates affinity information such that the affinity information increases with an increase in the number of times that or the rate at which the one or more word pairs acquired by the word pair acquisition unit co-occur with each of the one or more patterns, wherein the affinity information in the storage medium is the affinity information calculated by the affinity information calculation unit.

It is preferable that the above-described program is a program for causing the computer to function such that the score determination unit determines, as a score of each of the word pairs, a score of the seed pattern or the pattern that exhibits a maximum value of the product of the class pair favorableness degree, the similarity between the seed pattern and the pattern, and the affinity information.

With the above-described program, it is preferable to cause the computer to further function as a pattern acquisition unit that performs morphological analysis and dependency analysis on each sentence of one or more sentence groups stored in the storage medium, and acquires, taking a first noun or noun phrase as a starting point and a second noun or noun phrase as an end point, a linkage of morphemes from the starting point to the end point as a pattern, or acquires, as a pattern, a linkage of morphemes from the starting point to a morpheme where a linkage of morphemes starting from the starting point and a linkage of morphemes starting from the end point are linked, wherein the pattern in the storage medium is the pattern acquired by the pattern acquisition unit.

With the above-described program, it is preferable, with one or more excluded class pairs each consisting of two class identifiers for identifying a class pair corresponding to a word pair that is not to be eventually output being stored in the storage medium, to cause the computer to further function as a word pair exclusion unit that excludes the word pair corresponding to the one or more excluded class pairs from word pairs that are to be output.

With the above-described program, it is preferable, with class occurrence frequency information including a pair of a class identifier and an average frequency of occurrence, in the one or more sentence groups, of a word belonging to each class, on a class-by-class basis being stored in the storage medium, to cause the computer to further function as an excluded class pair accumulation unit that accumulates, in the excluded class pair storage unit, class identifiers for two classes having a difference equal to or greater than a predetermined threshold in the average frequency of occurrence as an excluded class pair.

FIG. 16 shows an external view of a computer that realizes the word pair acquisition apparatus 1 and the like according to the forgoing embodiment by executing the program described in the present specification. The foregoing embodiment may be implemented with computer hardware and a computer program executed thereon. FIG. 16 is a schematic view of a computer system 340. FIG. 17 is a diagram showing the internal configuration of the computer system 340.

In FIG. 16, the computer system 340 includes a computer 341 including an FD drive 3411 and a CD-ROM drive 3412, a keyboard 342, a mouse 343, and a monitor 344.

In FIG. 17, the computer 341 includes not only a FD drive 3411 and a CD-ROM drive 3412, but also a RAM 3416 that is connected to an MPU 3413, a bus 3414 that is connected to the CD-ROM drive 3412 and the FD drive 3411, and a ROM 3415 in which a program such as a startup program is to be stored, and in which a command of an application program is temporarily stored and a temporary storage area is to be provided, and an MPU 3413, and a hard disk 3417 in which an application program, a system program, and data are to be stored. Although not shown, the computer 341 may further include a network card that provides connection to a LAN.

The program for causing the computer system 340 to execute the functions of the word pair acquisition apparatus 1 and the like in the foregoing embodiment may be stored in a CD-ROM 3501 or an FD 3502, which are inserted into the CD-ROM drive 3412 or the FD drive 3411, and may be transmitted to the hard disk 3417. Alternatively, the program may be transmitted to the computer 341 via a network (not shown) and stored in the hard disk 3417. At the time of execution, the program is loaded into the RAM 3416. The program may be loaded from the CD-ROM 3501 or the FD 3502, or directly from a network.

The program does not necessarily have to include, for example, an operating system (OS) or a third party program to cause the computer 341 to execute the functions of the word pair acquisition apparatus 1 and the like in the foregoing embodiment. The program may only include a portion of command capable of calling an appropriate function (module) in a controlled mode and obtaining the desired results. The manner in which the computer system 340 operates is well known, and, thus, a detailed description thereof has been omitted.

Furthermore, the computer that executes this program may be a single computer, or may be multiple computers. In other words, centralized processing may be performed, or distributed processing may be performed.

Furthermore, in the foregoing embodiment, each process (each function) may be realized by integrated processing using a single apparatus (system), or may be realized by distributed processing using multiple apparatuses.

The present invention is not limited to the embodiment set forth herein. It will be appreciated that various modifications are within the scope of the present invention.

INDUSTRIAL APPLICABILITY

As described above, the word pair acquisition apparatus according to the present invention has the effect of being able to appropriately acquiring word pairs having a prescribed relationship, and is useful as a word pair acquisition apparatus and the like.

BRIEF DESCRIPTION OF THE DRAWINGS

FIG. 7 shows a word class information management table in Embodiment 1.

FIG. 8 shows a class occurrence frequency information management table in Embodiment 1.

FIG. 9 is a table showing an example of output of word pairs and the like in Embodiment 1.

FIG. 11 is a table showing an example of output of word pairs and the like in Embodiment 1.

FIG. 13 is a table showing an example of output of word pairs and the like in Embodiment 1.

FIG. 15 shows a probability distribution management table in Embodiment 1.

Figure 1:
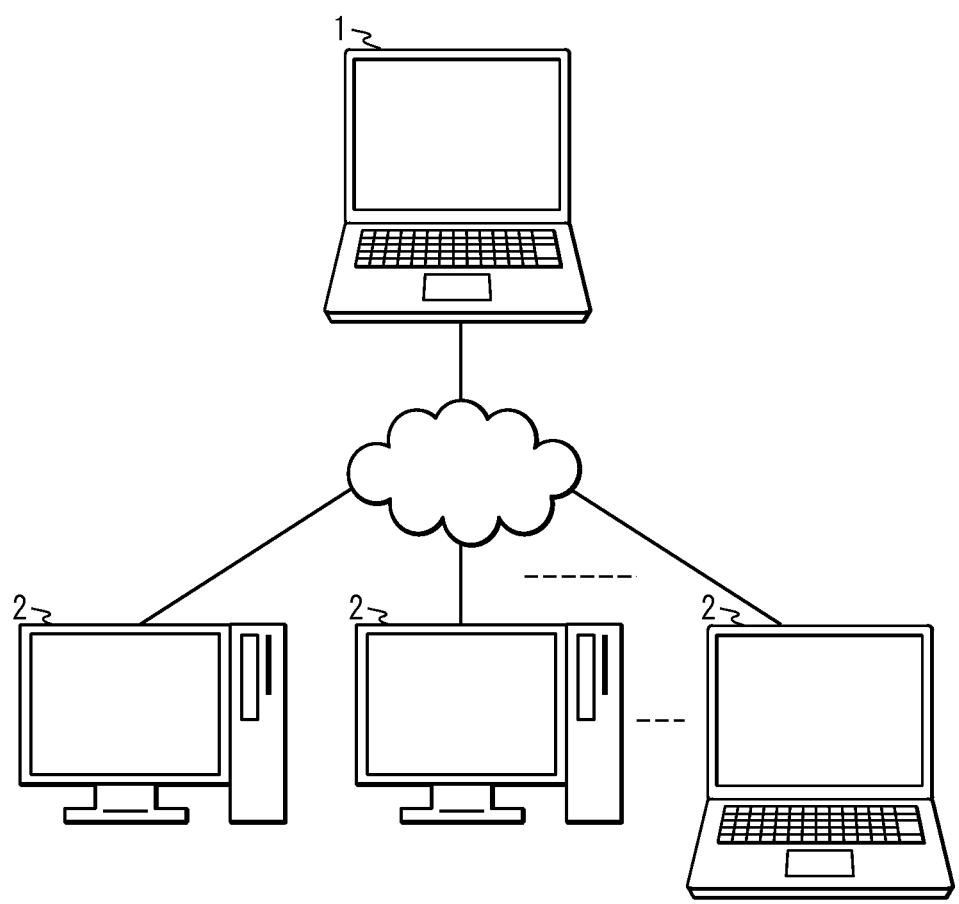
FIG. 1 is a conceptual diagram of a word acquisition system including a word pair acquisition apparatus 1 in Embodiment 1.
Figure 2:
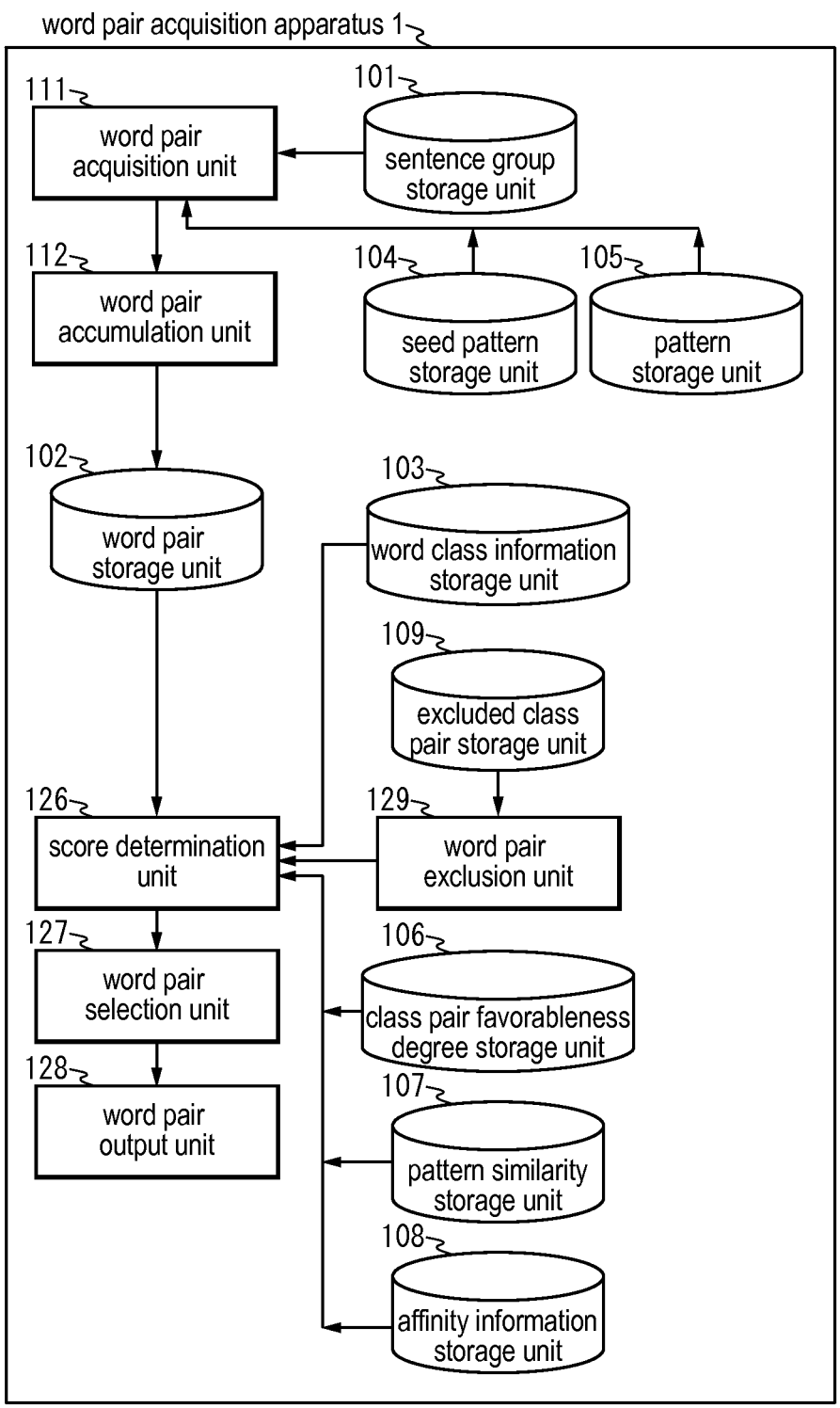
FIG. 2 is a block diagram focusing on those components of the word pair acquisition apparatus that perform processing for acquiring word pairs in Embodiment 1.
Figure 3:
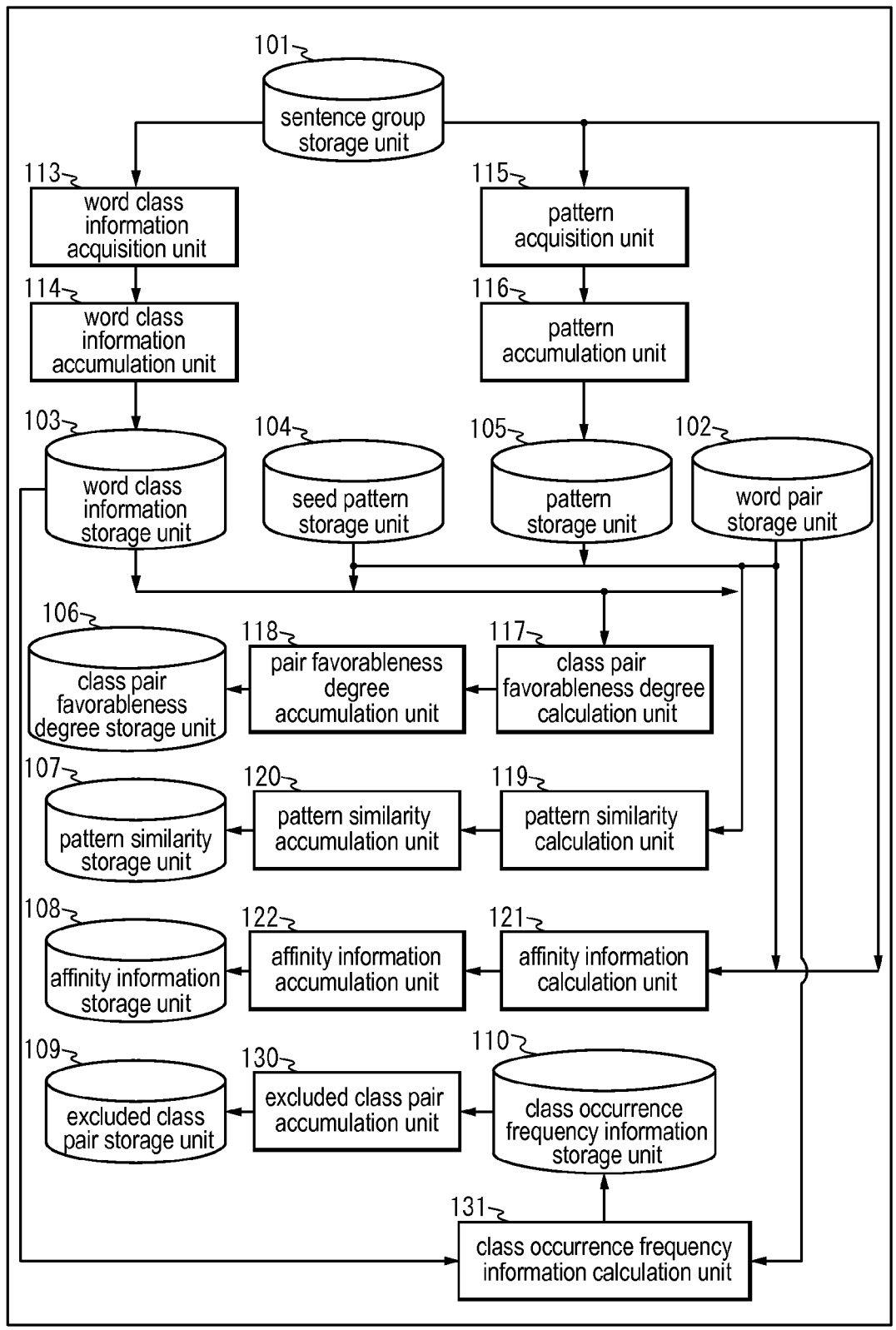
FIG. 3 is a block diagram focusing on those components of the word pair acquisition apparatus that perform environment preparation before performing the processing for acquiring word pairs.
Figure 4:
FIG. 4 shows a result of a dependency analysis on a character string in Embodiment 1.
Figure 5:
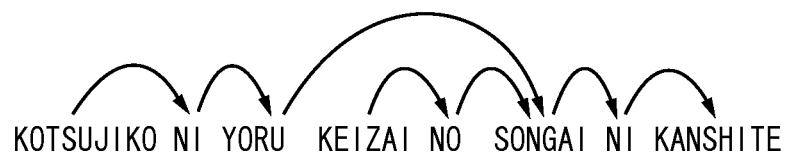
FIG. 5 shows a result of a dependency analysis on a character string in Embodiment 1
Figure 6:
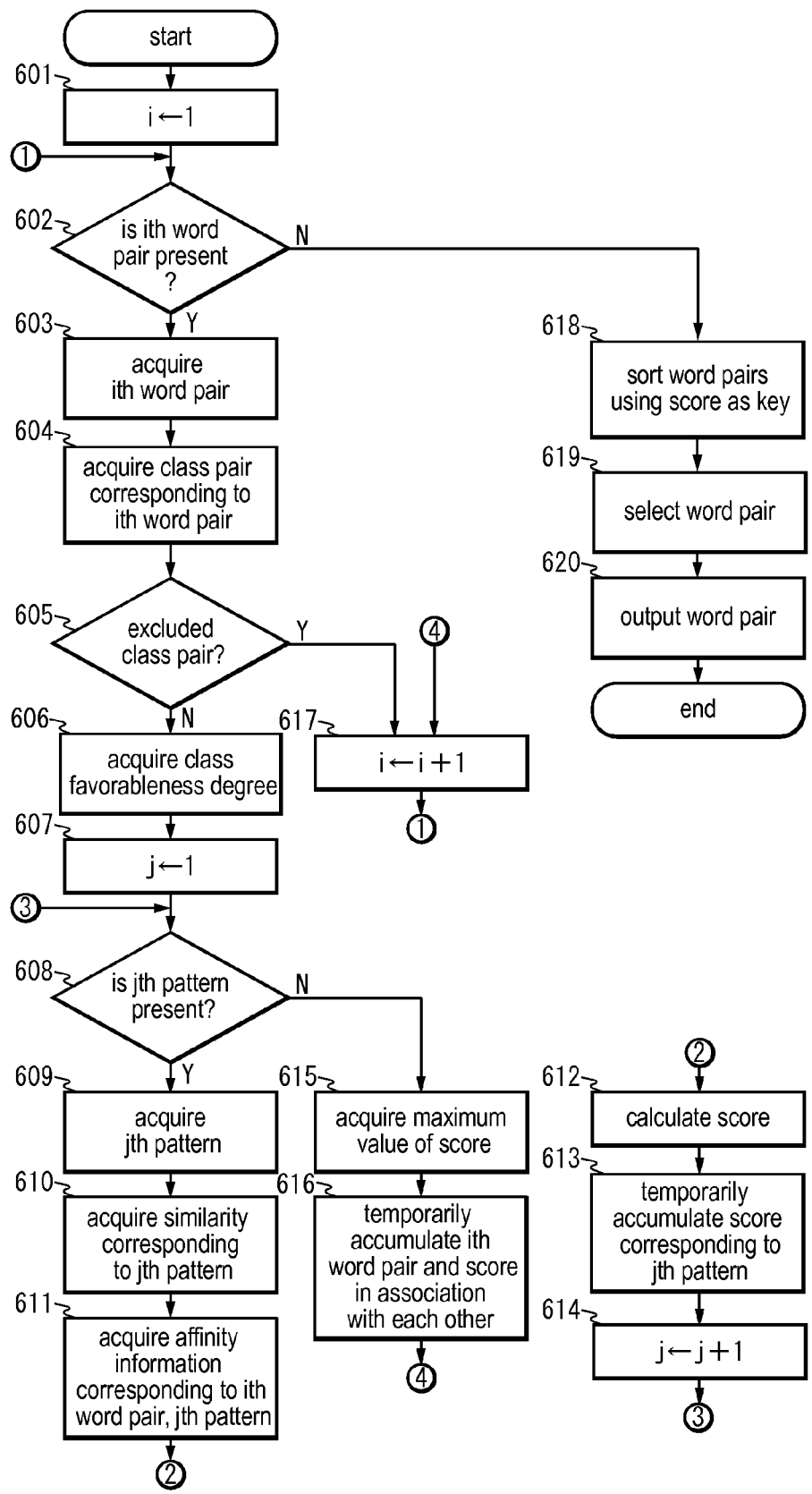
FIG. 6 is a flowchart illustrating the operation of the word pair acquisition apparatus.
Figure 10:
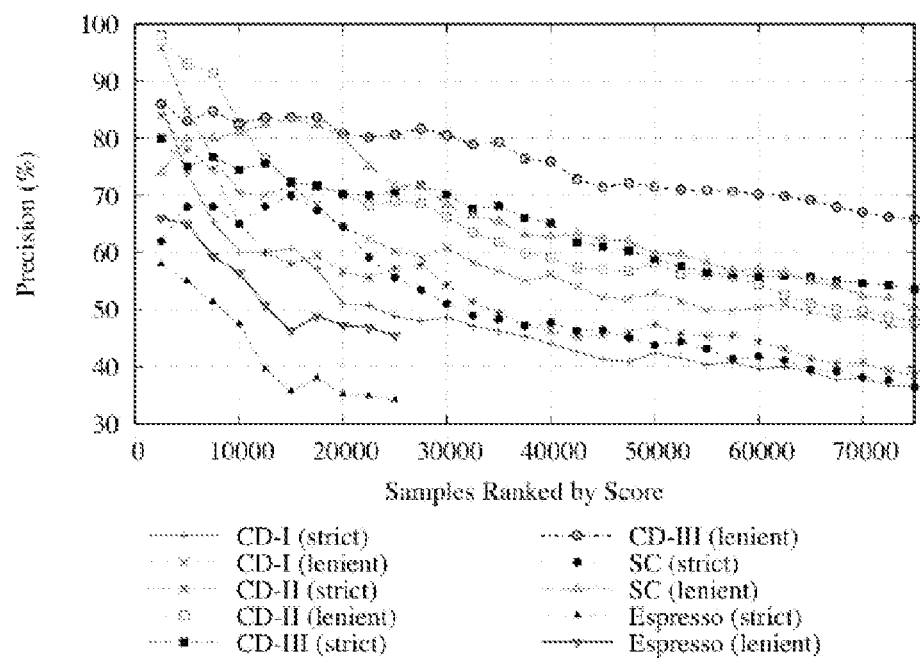
FIG. 10 is a graph showing the precision of the methods used in Experiment 1 in Embodiment 1.
Figure 12:
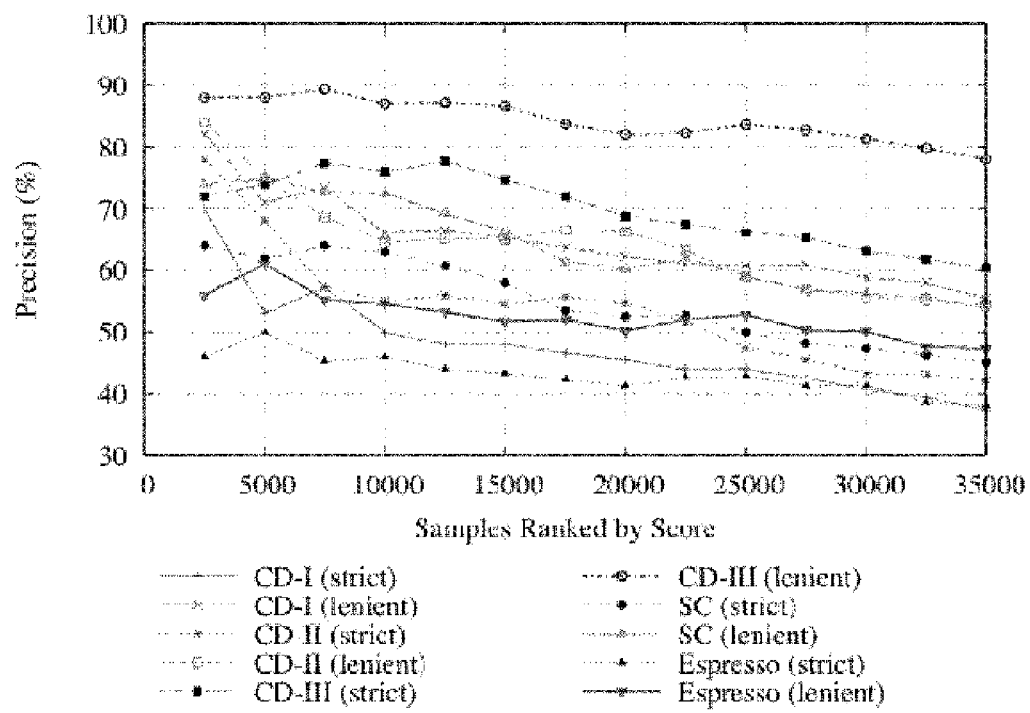
FIG. 12 is a graph showing the precision of the methods used in Experiment 2 in Embodiment 1.
Figure 14:
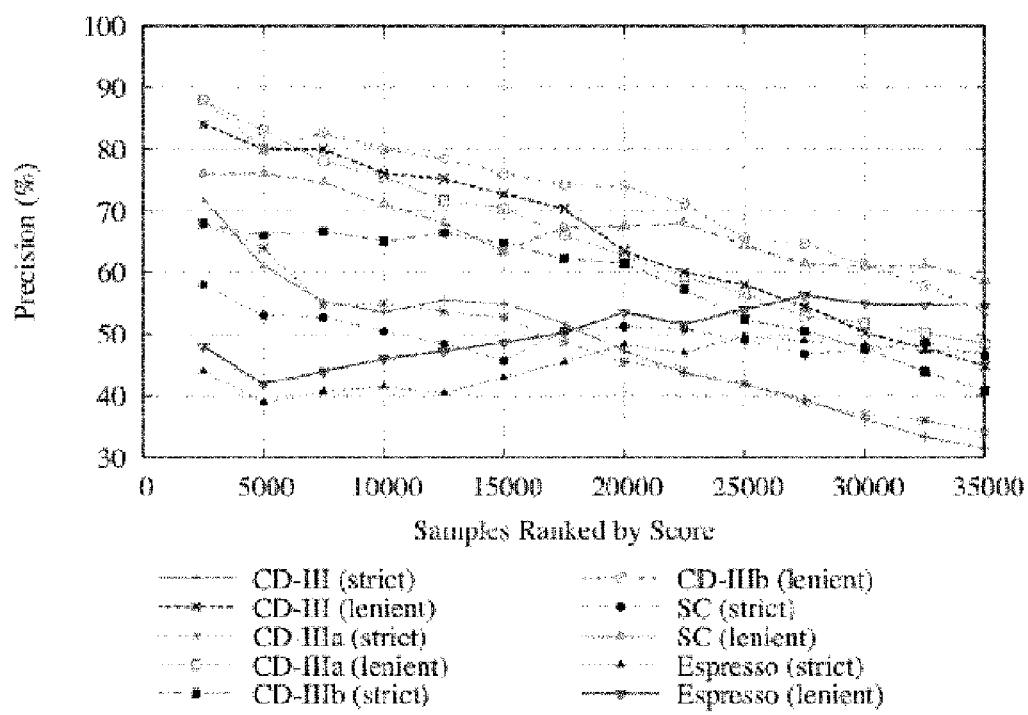
FIG. 14 is a graph showing the precision of the methods used in Experiment 3 in Embodiment 1.
Figure 16:
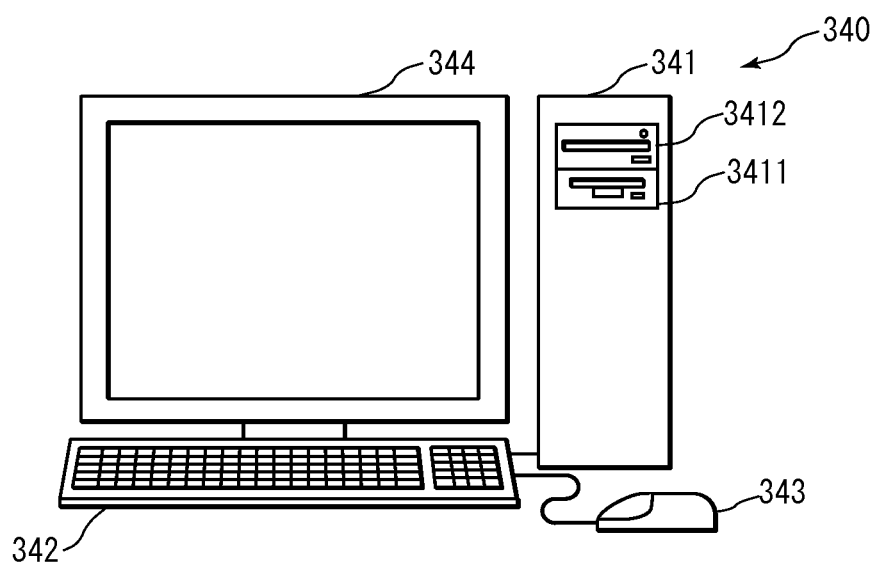
FIG. 16 is an overview diagram of a computer system in Embodiment 1.
Figure 17:
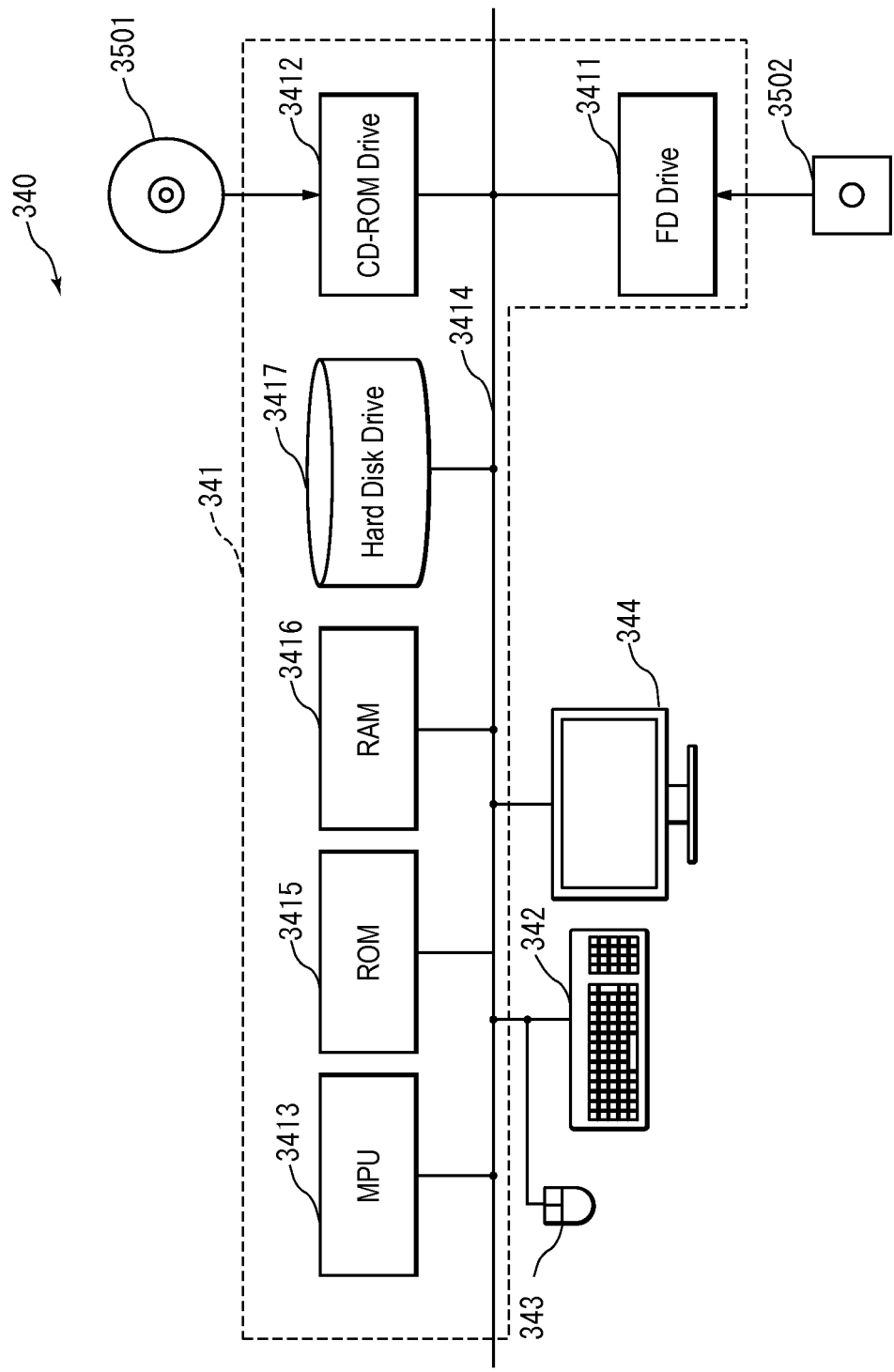
FIG. 17 is a block diagram of the computer system.

The invention claimed is:

1. A word pair acquisition apparatus having a non-transitory computer usable storage medium, the apparatus comprising:
   a sentence group storage unit in which one or more sentence groups can be stored;
   a word class information storage unit in which can be stored two or more pieces of word class information each piece including, in association with each other, one or more words and a class identifier for identifying a class to which the one or more words belong;
   a class pair favorableness degree storage unit in which can be stored a class pair favorableness degree serving as an index indicating the appropriateness of two classes;
   a word pair storage unit in which one or more word pairs each word pair consisting of two words can be stored;

a class pair favorableness degree acquisition unit that acquires, from the class pair favorableness degree storage unit, a class pair favorableness degree of two classes to which the words included in the one or more word pairs stored in the word pair storage unit respectively belong;

a score determination unit that uses the class pair favorableness degree acquired by the class pair favorableness degree acquisition unit to determine a score of each word pair of the word pairs in the word pair storage unit;

a word pair selection unit that acquires one or more word pairs having a score that has been determined by the score determination unit that is high enough to satisfy a predetermined condition;

a word pair output unit that outputs the one or more word pairs acquired by the word pair selection unit, a pattern storage unit in which can be stored one or more patterns that are not a seed pattern and are used for acquiring two word pairs having a prescribed relationship;

a pattern similarity storage unit in which can be stored a similarity between each pattern of the one or more patterns stored in the pattern storage unit and the seed pattern on a pattern-by-pattern basis;

a word pair acquisition unit that acquires either the one or more seed patterns stored in the seed pattern storage unit or the one or more patterns stored in the pattern storage unit, and acquires, from the one or more sentence groups stored in the sentence group storage unit, one or more word pairs co-occurring with the seed patterns or the patterns, wherein the score determination unit also uses the similarity between each pattern of the one or more patterns and the seed patterns that is stored in the pattern similarity storage unit to determine a score of each word pair of the word pairs acquired by the word pair acquisition unit; and a pattern similarity calculation unit that calculates a similarity, the similarity increases with an increase in overlap between a class pair corresponding to a word pair co-occurring with the one or more seed patterns and a class pair corresponding to a word pair co-occurring with each pattern of the one or more patterns stored in the pattern storage unit, wherein the similarity calculated by the pattern similarity calculation unit is the similarity stored in the pattern similarity storage unit.

2. The word pair acquisition apparatus according to claim 1, further comprising:

a seed pattern storage unit in which can be stored one or more seed patterns each pattern serving as a pattern used for acquiring two word pairs having a prescribed relationship; and a class pair favorableness degree calculation unit that calculates a class pair favorableness degree, the class pair favorableness degree increases with an increase in the number of times that or the rate at which word pairs respectively belonging to two classes co-occur with the one or more seed patterns in the one or more sentence groups in the sentence group storage unit, wherein the class pair favorableness degree of the two classes calculated by the class pair favorableness degree calculation unit is the class pair favorableness degree stored in the class pair favorableness degree storage unit.

3. The word pair acquisition apparatus according to claim 1, further comprising an affinity information storage unit in which can be stored affinity information serving as information relating to the affinity between each word pair of the one or more word pairs and each of the one or more patterns, wherein the score determination unit also uses the affinity information in the affinity information storage unit to determine a score of each word pair of the word pairs acquired by the word pair acquisition unit.

4. The word pair acquisition apparatus according to claim 3, further comprising an affinity information calculation unit that calculates affinity information, the affinity information increases with an increase in the number of times that or the rate at which the one or more word pairs acquired by the word pair acquisition unit co-occur with each of the one or more patterns, wherein the affinity information in the affinity information storage unit is the affinity information calculated by the affinity information calculation unit.

5. The word pair acquisition apparatus according to claim 4, wherein the score determination unit determines, as a score of each word pair of the word pairs, a score of the seed pattern or the pattern that exhibits a maximum value of the product of the class pair favorableness degree, the similarity between the seed pattern and the pattern, and the affinity information.

6. The word pair acquisition apparatus according to claim 1, further comprising a pattern acquisition unit that performs morphological analysis and dependency analysis on each sentence of one or more sentence groups stored in the sentence group storage unit, and acquires, taking a first noun or noun phrase as a starting point and a second noun or noun phrase as an end point, a linkage of morphemes from the starting point to the end point as a pattern, or acquires, as a pattern, a linkage of morphemes from the starting point to a morpheme where a linkage of morphemes starting from the starting point and a linkage of morphemes starting from the end point are linked, wherein the pattern in the pattern storage unit is the pattern acquired by the pattern acquisition unit.

7. The word pair acquisition apparatus according to claim 1, further comprising: an excluded class pair storage unit in which can be stored one or more excluded class pairs each word pair consisting of two class identifiers for identifying a class pair corresponding to a word pair that is not to be eventually output; and a word pair exclusion unit that excludes the word pair corresponding to the one or more excluded class pairs from word pairs that are to be output.

8. The word pair acquisition apparatus according to claim 7, further comprising: a class occurrence frequency information storage unit in which can be stored class occurrence frequency information including a pair of a class identifier and an average frequency of occurrence, in the one or more sentence groups, of a word belonging to each class, on a class-by-class basis; and an excluded class pair accumulation unit that accumulates, in the excluded class pair storage unit, class identifiers for two classes having a difference equal to or greater than a predetermined threshold in the average frequency of occurrence as an excluded class pair.

9. The word pair acquisition apparatus according to claim 1, further comprising a word class information acquisition unit that uses the one or more sentence groups in the sentence group storage unit to acquire one or more pieces of word class information, wherein words co-occurring with same verb or with the same verb and a postpositional particle a large number of times or at a high rate belong to the same class, wherein the word class information in the word class information storage unit is the word class information acquired by the word class information acquisition unit.

10. A word pair acquisition system, comprising:

a memory, a word pair acquisition unit, a class pair favorableness degree acquisition unit, a score determination unit, a word pair selection unit, and a word pair output unit with one or more sentence groups;

two or more pieces of word class information each piece including, in association with each other, one or more words and a class identifier for identifying a class to which the one or more words belong;

a class pair favorableness degree serving as an index indicating the appropriateness of two classes;

one or more seed patterns each seed pattern serving as a pattern used for acquiring two word pairs having a prescribed relationship being stored in a storage medium;

a word pair acquiring step of acquiring, with the word pair acquisition unit, any of the one or more seed patterns stored in the storage medium, and acquiring one or more word pairs co-occurring with the acquired seed pattern from the one or more sentence groups stored in the storage medium;

a class pair favorableness degree acquiring step of acquiring, with the class pair favorableness degree acquisition unit, from the storage medium, a class pair favorableness degree of two classes to which words included in the one or more word pairs acquired in the word pair acquiring step respectively belong;

a score determining step of using, with the score determination unit, the class pair favorableness degree acquired in the class pair favorableness degree acquiring step to determine a score of each word pair of the word pairs acquired in the word pair acquiring step;

a word pair selecting step of acquiring, with the word pair selection unit, one or more word pairs having a score that has been determined in the score determining step that is high enough to satisfy a predetermined condition;

a word pair output step of outputting, with the word pair output unit, the one or more word pairs acquired in the word pair selecting step;

a pattern storage unit in which can be stored one or more patterns that are not a seed pattern and are used for acquiring two word pairs having the prescribed relationship;

a pattern similarity storage unit in which can be stored a similarity between each pattern of the one or more patterns stored in the pattern storage unit and the seed pattern on a pattern-by-pattern basis;

a word pair acquisition unit that acquires either the one or more seed patterns stored in the seed pattern storage unit or the one or more patterns stored in the pattern storage unit, and acquires, from the one or more sentence groups stored in the sentence group storage unit, one or more word pairs co-occurring with the seed patterns or the patterns, wherein the score determination unit also uses the similarity between each pattern of the one or more patterns and the seed patterns that is stored in the pattern similarity storage unit to determine a score of each word pair of the word pairs acquired by the word pair acquisition unit; and a pattern similarity calculation unit that calculates a similarity, the similarity increases with an increase in overlap between a class pair corresponding to a word pair co-occurring with the one or more seed patterns and a class pair corresponding to a word pair co-occurring with each pattern of the one or more patterns stored in the pattern storage unit, wherein the similarity calculated by the pattern similarity calculation unit is the similarity stored in the pattern similarity storage unit.

11. A program stored in a non-transitory computer usable storage medium, the program comprising:

one or more sentence groups;

two or more pieces of word class information each piece including, in association with each other, one or more words and a class identifier for identifying a class to which the one or more words belong;

a class pair favorableness degree serving as an index indicating the appropriateness of two classes; and one or more seed patterns each pattern serving as a pattern used for acquiring two word pairs having a prescribed relationship, for causing a computer to function as:

a word pair acquisition unit that acquires any of the one or more seed patterns stored in the storage medium, and acquires one or more word pairs co-occurring with the acquired seed pattern from the one or more sentence groups stored in the storage medium;

a class pair favorableness degree acquisition unit that acquires, from the storage medium, a class pair favorableness degree of two classes to which words included in the one or more word pairs acquired by the word pair acquisition unit respectively belong;

a score determination unit that uses the class pair favorableness degree acquired by the class pair favorableness degree acquisition unit to determine a score of each word pair of the word pairs acquired by the word pair acquisition unit;

a word pair selection unit that acquires one or more word pairs having a score that has been determined by the score determination unit that is high enough to satisfy a predetermined condition;

a word pair output unit that outputs the one or more word pairs acquired by the word pair selection unit;

a pattern storage unit in which can be stored one or more patterns that are not a seed pattern and are used for acquiring two word pairs having the prescribed relationship;

a pattern similarity storage unit in which can be stored a similarity between each of the one or more patterns stored in the pattern storage unit and the seed pattern on a pattern-by-pattern basis;

a word pair acquisition unit that acquires either the one or more seed patterns stored in the seed pattern storage unit or the one or more patterns stored in the pattern storage unit, and acquires, from the one or more sentence groups stored in the sentence group storage unit, one or more word pairs co-occurring with the seed patterns or the patterns, wherein the score determination unit also uses the similarity between each pattern of the one or more patterns and the seed patterns that is stored in the pattern similarity storage unit to determine a score of each word pair of the word pairs acquired by the word pair acquisition unit; and a pattern similarity calculation unit that calculates a similarity, the similarity increases with an increase in overlap between a class pair corresponding to a word pair co-occurring with the one or more seed patterns and a class pair corresponding to a word pair co-occurring with each of the one or more patterns stored in the pattern storage unit, wherein the similarity calculated by the pattern similarity calculation unit is the similarity stored in the pattern similarity storage unit.

* * * * *